United States Patent
Yue et al.

(10) Patent No.: US 10,915,360 B2
(45) Date of Patent: Feb. 9, 2021

(54) RESOURCE PROCESSING METHOD, APPARATUS, AND TERMINAL

(71) Applicant: HUAWEI TECHNOLOGIES CO., LTD., Guangdong (CN)

(72) Inventors: Rui Yue, Xi'an (CN); Liang Chen, Xi'an (CN); Mingchao Li, Beijing (CN); Yao Hua, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 16/263,789

(22) Filed: Jan. 31, 2019

(65) Prior Publication Data

US 2019/0163531 A1 May 30, 2019

Related U.S. Application Data

(63) Continuation of application No. PCT/CN2016/094715, filed on Aug. 11, 2016.

(51) Int. Cl.
*G06F 9/50* (2006.01)
*H04W 72/02* (2009.01)
(Continued)

(52) U.S. Cl.
CPC .......... *G06F 9/5011* (2013.01); *G06F 9/5038* (2013.01); *H04L 41/0893* (2013.01);
(Continued)

(58) Field of Classification Search
CPC .................................................. G06F 9/5011
(Continued)

(56) References Cited

U.S. PATENT DOCUMENTS 5,745,481 A * 4/1998 Phillips ................. H04H 20/67
370/313
7,930,398 B2 * 4/2011 Kawato ................. G06F 9/5027
709/226
(Continued)

FOREIGN PATENT DOCUMENTS

CN 103843444 A 6/2014
CN 104796986 A 7/2015
(Continued)

OTHER PUBLICATIONS

Chen, Shanzhi, et al. "Vehicle-to-everything (V2X) services supported by LTE-based systems and 5G." IEEE Communications Standards Magazine 1.2 (2017): pp. 70-76. (Year: 2012).*
(Continued)

*Primary Examiner* — Satish Rampuria
(74) *Attorney, Agent, or Firm* — Kilpatrick Townsend & Stockton LLP

(57) ABSTRACT

Embodiments of the present application provide a resource processing method, an apparatus, and a terminal. The method includes: receiving, by a first terminal, a first message simultaneously sent by each of at least one second terminal, where the first message is carried on N resources and used to indicate location information of resources on which to-be-sent data is located, and N is a positive integer greater than or equal to 2; and determining, by the first terminal based on the location information of the resources on which the to-be-sent data is located, resources used by the first terminal to send data. Because the first message is carried on the N resources, a probability of collision of the resources used by the second terminal to send the first message is very low.

19 Claims, 11 Drawing Sheets

(51) Int. Cl.
*H04W 4/46* (2018.01)
*H04L 12/24* (2006.01)

(52) U.S. Cl.
CPC ............. *H04W 4/46* (2018.02); *H04W 72/02* (2013.01); *G06F 2209/5011* (2013.01)

(58) Field of Classification Search
USPC ...................................................... 718/1–108
See application file for complete search history.

(56) References Cited

U.S. PATENT DOCUMENTS

| | | | | |
|---|---|---|---|---|
| 2010/0316011 | A1* | 12/2010 | Lin | ........................ H04L 5/0094 |
| | | | | 370/329 |
| 2014/0094183 | A1 | 4/2014 | Gao et al. | |
| 2014/0164620 | A1* | 6/2014 | Tamura | ............... H04L 12/1432 |
| | | | | 709/226 |
| 2016/0302249 | A1* | 10/2016 | Sheng | ..................... H04W 4/70 |
| 2016/0345313 | A1 | 11/2016 | Zhao et al. | |
| 2017/0006582 | A1* | 1/2017 | Jung | ..................... H04W 72/02 |
| 2017/0013598 | A1* | 1/2017 | Jung | ..................... H04W 72/02 |
| 2017/0055280 | A1 | 2/2017 | Kim et al. | |
| 2017/0215199 | A1 | 7/2017 | Wu et al. | |
| 2017/0230959 | A1 | 8/2017 | Wu et al. | |
| 2017/0311206 | A1* | 10/2017 | Ryoo | .................... H04W 28/18 |

FOREIGN PATENT DOCUMENTS

| | | |
|---|---|---|
| CN | 105282846 A | 1/2016 |
| CN | 105307107 A | 2/2016 |
| CN | 105451211 A | 3/2016 |
| CN | 105517168 A | 4/2016 |
| WO | 2015122718 A1 | 8/2015 |
| WO | 2015184917 A1 | 12/2015 |
| WO | 2016045443 A1 | 3/2016 |

OTHER PUBLICATIONS

MacHardy, Zachary, et al. "V2X access technologies: Regulation, research, and remaining challenges." IEEE Communications Surveys & Tutorials 20.3 (2018): pp. 1858-1877. (Year: 2018).*
Botsov, Mladen, et al. "Location-based resource allocation for mobile D2D communications in multicell deployments." 2015 IEEE international conference on communication workshop (ICCW). IEEE, 2015. pp. 2444-2450 (Year: 2015).*
Abbas, Fakhar, Pingzhi Fan, and Zahid Khan. "A novel low-latency V2V resource allocation scheme based on cellular V2X communications." IEEE Transactions on Intelligent Transportation Systems 20.6 (2018): pp. 2185-2197. (Year: 2018).*
Vukadinovic, Vladimir, et al. "3GPP C-V2X and IEEE 802.11 p for Vehicle-to-Vehicle communications in highway platooning scenarios." Ad Hoc Networks 74 (2018): pp. 17-29. (Year: 2018).*
Masmoudi, Ahlem, et al. "Radio Resource Allocation Algorithm for Device to Device based on LTE-V2X Communications." ICETE ( 1) 2018.pp. 265-271 (Year: 2018).*
International Search Report dated May 10, 2017 in corresponding International Application No. PCT/CN2016/094715.
XP051079565 R1-162415 ZTE, "Coexistence of PC5-based V2V operation and legacy Uu operation", 3GPP TSG RAN WG1 Meeting #84bis, Busan, Korea Apr. 11-15, 2016, total 3 pages.
International Search Report dated May 10, 2017 in corresponding International Patent Application No. PCT/CN2016/094715 (7 pages).
Written Opinion of the International Searching Authority dated May 10, 2017 in corresponding International Patent Application No. PCT/CN2016/094715 (4 pages).

* cited by examiner

A terminal 1 sends a resource
indication message in resource
pools 2, 4, 6, and 8

A terminal 2 sends a resource
indication message in resource
pools 1, 4, 6, and 7

RESOURCE PROCESSING METHOD, APPARATUS, AND TERMINAL

CROSS-REFERENCE TO RELATED APPLICATIONS

This application is a continuation of International Application No. PCT/CN2016/094715, filed on Aug. 11, 2016, the disclosure of which is hereby incorporated by reference in its entirety.

TECHNICAL FIELD

Embodiments of the present application relate to communications technologies, and in particular, to a resource processing method, an apparatus, and a terminal.

BACKGROUND

A Long Term Evolution (LTE)-based vehicle to everything (V2X) technology is a technology that enables a vehicle to directly communicate with another type of terminal (vehicle terminal or personal terminal) or an infrastructure (a roadside unit (RSU). The vehicle, the another type of terminal, the infrastructure, and the like may be collectively referred to as terminals in the V2X technology. One of main scenarios of the V2X technology is communication for vehicle safety. To be specific, secure application messages are sent between the vehicle and the another type of vehicle or between the vehicle and the infrastructure. Therefore, the V2X technology has a relatively high requirement on reliability.

The V2X technology supports autonomous selection of a resource by a terminal out of coverage of a base station. A process of autonomously selecting a resource by the terminal includes: when the terminal sends current data, the terminal further sends a resource indication message, where the resource indication message is carried on a resource, and used to indicate location information of a resource that is determined by the terminal and used to send to-be-sent data. The resource herein is a resource block (RB) or a resource element (RE). Another terminal receives and parses the resource indication message, and avoids, as much as possible when determining a resource, the resource already determined by the foregoing terminal, to avoid resource collision. FIG. 1A is a schematic diagram for determining a resource by a terminal 1 according to the prior art. As shown in FIG. 1A, the terminal 1 determines a resource 1, and sends a resource indication message. FIG. 1B is a schematic diagram for determining a resource by a terminal 2 according to the prior art. As shown in FIG. 1B, when the terminal 2 needs to determine a resource, because the terminal 2 receives the resource indication message sent by the terminal 1, the terminal 2 avoids the resource 1, and selects a resource 2 as the determined resource.

However, when the terminal 1 and the terminal 2 simultaneously send resource indication messages on a same resource, due to resource collision, a terminal 3 possibly cannot detect the resource indication messages of the terminal 1 and the terminal 2, or a terminal 3 can detect a resource indication message of only one terminal. Therefore, the terminal 3 cannot accurately determine a resource used to send to-be-sent data, and reliability of the V2X system is relatively low.

SUMMARY

Embodiments of the present application provide a resource processing method, an apparatus, and a terminal to improve reliability of a V2X system.

According to a first aspect, an embodiment of the present application provides a resource processing method, including:

receiving, by a first terminal, a first message simultaneously sent by each of at least one second terminal, where the first message is carried on N resources and used to indicate location information of resources on which to-be-sent data is located, and N is a positive integer greater than or equal to 2; and determining, by the first terminal based on the location information of the resources on which the to-be-sent data is located, resources used by the first terminal to send data.

Because the first message is carried on the N resources, a probability of collision of the resources used by the second terminal to send the first message is very low. On this basis, the first terminal easily learns the resources determined by the second terminal, and therefore can accurately determine, based on the resources determined by the second terminal, the resources used by the first terminal to send the data. This further avoids collision between the resources used by the first terminal to send the data and the resources used by the second terminal to send the to-be-sent data, and improves reliability of a V2X system.

Optionally, the first message is carried on the N resources in at least one resource pool;

the location information of the resources on which the to-be-sent data is located is location information of a resource pool to which the resources belong, and each resource pool includes a plurality of resources; and correspondingly, the determining, by the first terminal based on the location information of the resources on which the to-be-sent data is located, resources used by the first terminal to send data includes:

determining, by the first terminal based on the location information of the resource pool to which the resources belong, a resource pool used by the first terminal to send the data; and determining, by the first terminal from the determined resource pool, the resources used by the first terminal to send the data.

Optionally, the determining, by the first terminal based on the location information of the resource pool to which the resources belong, a resource pool used by the first terminal to send the data includes:

when the first terminal has not determined the resource pool used to send the data, determining, by the first terminal based on the location information of the resource pool to which the resources belong, the resource pool used by the first terminal to send the data; or when the first terminal has determined the resource pool used to send the data, redetermining, by the first terminal based on the location information of the resource pool to which the resources belong and location information of the resource pool that has been determined by the first terminal and is used to send the data, a resource pool used by the first terminal to send the data.

Optionally, the when the first terminal has not determined a resource pool used to send the data, determining, by the first terminal based on the location information of the resource pool to which the resources belong, the resource pool used by the first terminal to send the data includes:

determining, by the first terminal, usage of each resource pool based on the location information of the resource pool to which the resources belong;

determining, by the first terminal, a priority of each resource pool based on usage of each resource pool; and determining, by the first terminal, that a resource pool with a highest priority is used by the first terminal to send the data; where usage of each resource pool includes any one of the following: each resource pool is simultaneously determined by a plurality of terminals, each resource pool is determined by one terminal, or each resource pool is not determined by any terminal.

Because the first terminal determines that the resource pool with the highest priority is used by the first terminal to send the data, this further avoids collision between the resources used by the first terminal to send the data and the resources used by the second terminal to send the to-be-sent data, and improves reliability of the V2X system.

Optionally, the determining, by the first terminal, a priority of each resource pool based on usage of each resource pool includes:

when usage of each resource pool is that each resource pool is simultaneously determined by the plurality of terminals, determining, by the first terminal, that the priority of each resource pool is a first priority;

when usage of each resource pool is that each resource pool is determined by one terminal, determining, by the first terminal, that the priority of each resource pool is a second priority; or when usage of each resource pool is that each resource pool is not determined by any terminal, determining, by the first terminal, that the priority of each resource pool is a third priority; where both the first priority and the second priority are lower than the third priority.

In this way, an accurate priority can be set for each resource pool, and therefore reliability of the V2X system is improved.

Optionally, the when the first terminal has determined a resource pool used to send the data, redetermining, by the first terminal based on the location information of the resource pool to which the resources belong and location information of the resource pool that has been determined by the first terminal and is used to send the data, a resource pool used by the first terminal to send the data includes:

determining, by the first terminal, usage of each resource pool based on the location information of the resource pool to which the resources belong and the location information of the resource pool that has been determined by the first terminal and is used to send the data;

determining, by the first terminal, a priority of each resource pool based on usage of each resource pool and the location information of the resource pool that has been determined by the first terminal and is used to send the data; and determining, by the first terminal, that a resource pool with a highest priority is used by the first terminal to send the data; where usage of each resource pool includes any one of the following: each resource pool is simultaneously determined by a plurality of terminals, each resource pool is determined by one terminal, or each resource pool is not determined by any terminal.

Because the first terminal determines that the resource pool with the highest priority is used by the first terminal to send the data, this further avoids collision between the resources used by the first terminal to send the data and the resources used by the second terminal to send the to-be-sent data, and improves reliability of the V2X system.

Optionally, the determining, by the first terminal, a priority of each resource pool based on usage of each resource pool and the location information of the resource pool that has been determined by the first terminal and is used to send the data includes:

when usage of each resource pool is that each resource pool is simultaneously determined by the plurality of terminals, determining, by the first terminal, that the priority of each resource pool is a fourth priority; or when usage of each resource pool is that each resource pool is determined by one terminal, determining, by the first terminal based on the location information of the resource pool that has been determined by the first terminal and is used to send the data, whether the one terminal is the first terminal; and when the first terminal determines that the one terminal is the first terminal, determining, by the first terminal, that the priority of each resource pool is a fifth priority; or when the first terminal determines that the one terminal is not the first terminal, determining, by the first terminal, that the priority of each resource pool is a sixth priority; or when usage of each resource pool is that each resource pool is not determined by any terminal, determining, by the first terminal, that the priority of each resource pool is a seventh priority; where both the fourth priority and the sixth priority are lower than the fifth priority, and both the fourth priority and the sixth priority are lower than the seventh priority.

In this way, an accurate priority can be set for each resource pool, and therefore reliability of the V2X system is improved.

Optionally, before the determining, by the first terminal based on the location information of the resource pool to which the resources belong, a resource pool used by the first terminal to send the data, the method further includes:

obtaining, by the first terminal, distance information and/or power information of each second terminal; and determining, by the first terminal based on the distance information and/or the power information, at least one second terminal that meets preset conditions, where the distance information is a distance between the first terminal and each second terminal, a preset condition corresponding to the distance information is that the distance between the first terminal and each second terminal is less than a distance threshold, and a preset condition corresponding to the power information is that a power value of each second terminal is greater than a power threshold; and correspondingly, the determining, by the first terminal based on the location information of the resource pool to which the resources belong, a resource pool used by the first terminal to send the data includes:

determining, by the first terminal based on location information of a resource pool used by each of the at least one second terminal that meets the preset conditions to send to-be-sent data, the resource pool used by the first terminal to send the data.

In other words, before the first terminal determines, based on the location information of the resource pool to which the resources belong, the resource pool used by the first terminal to send the data, the first terminal needs to filter the first message sent by the second terminal. Filtering can increase a convergence rate of resource processing and therefore improve system performance of the V2X system.

Optionally, the method further includes: sending, by the first terminal, a second message to a third terminal, where the second message includes usage of each resource pool, so that each third terminal determines, based on usage of each resource pool, a resource pool used by the third terminal to send data.

According to a second aspect, an embodiment of the present application provides a resource processing method, including:

receiving, by a third terminal, a second message sent by each of at least one first terminal, where the second message includes usage of each resource pool, each resource pool includes a plurality of resources, usage of each resource pool is determined by the first terminal based on a first message simultaneously sent by each of at least one second terminal, the first message is carried on N resources in at least one resource pool, and N is a positive integer greater than or equal to 2; and determining, by the third terminal based on usage of each resource pool, a resource pool used by the third terminal to send data, and determining, from the determined resource pool, resources used by the third terminal to send the data.

Because the first message is carried on the N resources in the at least one resource pool, a probability of collision of the resource pool used by the second terminal to send the first message is very low. On this basis, the first terminal easily learns the resource pool determined by the second terminal, and therefore, can accurately determine usage of each resource pool, and send the second message carrying the usage to the third terminal; and the third terminal may accurately determine the data pool used to send the data, thereby improving reliability of a V2X system.

Optionally, the determining, by the third terminal based on usage of each resource pool, a resource pool used by the third terminal to send data includes:

when the third terminal has not determined the resource pool used to send the data, determining, by the third terminal based on usage of each resource pool, the resource pool used by the third terminal to send the data; or when the third terminal has determined the resource pool used to send the data, redetermining, by the third terminal based on usage of each resource pool and location information of the resource pool determined by the third terminal and used to send the data, a resource pool used by the third terminal to send the data.

Optionally, the when the third terminal has not determined a resource pool used to send the data, determining, by the third terminal based on usage of each resource pool, the resource pool used by the third terminal to send the data includes:

determining, by the third terminal, a priority of each resource pool based on usage of each resource pool included in each second message; and determining, by the third terminal, that a resource pool with a highest priority is used by the third terminal to send the data; where usage of each resource pool includes any one of the following: each resource pool is simultaneously determined by a plurality of terminals, each resource pool is determined by one terminal, or each resource pool is not determined by any terminal.

Because the third terminal determines that the resource pool with the highest priority is used by the third terminal to send the to-be-sent data, this further avoids collision between the resources used by the third terminal to send the data and the resources used by the second terminal to send the to-be-sent data, and improves reliability of the V2X system.

Optionally, the determining, by the third terminal, a priority of each resource pool based on usage of each resource pool included in each second message includes:

when usage of each resource pool included in at least one second message is that each resource pool is simultaneously determined by the plurality of terminals, determining, by the third terminal, that the priority of each resource pool is a first priority;

when usage of each resource pool included in no second message is that each resource pool is simultaneously determined by the plurality of terminals, or usage of each resource pool included in at least one second message is that each resource pool is determined by one terminal, determining, by the third terminal, that the priority of each resource pool is a second priority; or when usage of each resource pool included in each second message is that each resource pool is not determined by any terminal, determining, by the third terminal, that the priority of each resource pool is a third priority; where both the first priority and the second priority are lower than the third priority.

In this way, an accurate priority can be set for each resource pool, and therefore reliability of the V2X system is improved.

Optionally, the when the third terminal has determined a resource pool used to send the data, redetermining, by the third terminal based on usage of each resource pool and location information of the resource pool determined by the third terminal and used to send the data, a resource pool used by the third terminal to send the data includes:

determining, by the third terminal, a priority of each resource pool based on usage of each resource pool included in each second message and location information of at least one resource pool determined by the third terminal and used to send the to-be-sent data; and determining, by the third terminal, that a resource pool with a highest priority is used by the third terminal to send the to-be-sent data; where usage of each resource pool includes any one of the following: each resource pool is simultaneously determined by a plurality of terminals, each resource pool is determined by one terminal, or each resource pool is not determined by any terminal.

Because the third terminal determines that the resource pool with the highest priority is used by the third terminal to send the to-be-sent data, this further avoids collision between the resources used by the third terminal to send the data and the resources used by the second terminal to send the to-be-sent data, and improves reliability of the V2X system.

Optionally, the determining, by the third terminal, a priority of each resource pool based on usage of each resource pool included in each second message and location information of at least one resource pool determined by the third terminal and used to send the to-be-sent data includes:

when usage of each resource pool included in at least one second message is that each resource pool is simultaneously determined by the plurality of terminals, determining, by the third terminal, that the priority of each resource pool is a fourth priority; or when usage of each resource pool included in no second message is that each resource pool is simultaneously determined by the plurality of terminals, or usage of each resource pool included in at least one second message is that each resource pool is determined by one terminal, determining, by the third terminal based on the location information of the at least one resource pool determined by the third terminal and used to send the to-be-sent data, whether the one terminal is the third terminal; and when the third terminal determines that the one terminal is the third terminal, determining, by the third terminal, that the priority of each resource pool is a fifth priority; or when the third terminal determines that the one terminal is not the third terminal, determining, by the third terminal, that the priority of each resource pool is a sixth priority; or when usage of each resource pool included in each second message is that each resource pool is not determined by any terminal, determining, by the third terminal, that the priority of each resource pool is a seventh priority; where the fourth priority and the sixth priority are lower than the fifth priority, and the fourth priority and the sixth priority are lower than the seventh priority.

In this way, an accurate priority can be set for each resource pool, and therefore reliability of the V2X system is improved.

Optionally, before the determining, by the third terminal based on usage of each resource pool, a resource pool used by the third terminal to send data, the method further includes:

obtaining, by the third terminal, distance information and/or power information of each first terminal; and determining, by the third terminal based on the distance information and/or the power information, a first terminal that meets preset conditions, where the distance information is a distance between the third terminal and each first terminal, a preset condition corresponding to the distance information is that the distance between the third terminal and each first terminal is less than a distance threshold, and a preset condition corresponding to the power information is that a power value of each first terminal is greater than a power threshold; and correspondingly, the determining, by the third terminal based on usage of each resource pool, a resource pool used by the third terminal to send data includes:

determining, by the third terminal based on usage of each resource pool included in a second message sent by the first terminal that meets the preset conditions, the resource pool used by the third terminal to send the data.

In other words, before the third terminal determines, based on usage of each resource pool, the resource pool used by the third terminal to send the data, the third terminal needs to filter the second message sent by the first terminal. Filtering can increase a convergence rate of resource processing and therefore improve system performance of the V2X system.

Optionally, the first message includes first indication information and second indication information, the first indication information is used to indicate location information of a resource pool used by each second terminal to send current data, and the second indication information is used to indicate an offset of the location information of the resource pool used to send the current data, to a resource pool in which to-be-sent data of each second terminal is located.

The following describes a resource processing apparatus. The apparatus corresponds to the foregoing method. Technical effects of the method and the apparatus are the same, and are not described again herein.

According to a third aspect, an embodiment of the present application provides a resource processing apparatus, including:

a receiving module, configured to receive a first message simultaneously sent by each of at least one second terminal, where the first message is carried on N resources and used to indicate location information of resources on which to-be-sent data is located, and N is a positive integer greater than or equal to 2; and a determining module, configured to determine, based on the location information of the resources on which the to-be-sent data is located, resources used by the apparatus to send data.

Optionally, the first message is carried on the N resources in at least one resource pool;

the location information of the resources on which the to-be-sent data is located is location information of a resource pool to which the resources belong, and each resource pool includes a plurality of resources; and correspondingly, the determining module is specifically configured to:

determine, based on the location information of the resource pool to which the resources belong, a resource pool used by the apparatus to send the data; and determine, from the determined resource pool, the resources used by the apparatus to send the data.

Optionally, the determining module is specifically configured to:

when the apparatus has not determined the resource pool used to send the data, determine, based on the location information of the resource pool to which the resources belong, the resource pool used by the apparatus to send the data; or when the apparatus has determined the resource pool used to send the data, redetermine, based on the location information of the resource pool to which the resources belong and location information of the resource pool determined by the apparatus and used to send the data, a resource pool used by the apparatus to send the data.

Optionally, the determining module is specifically configured to:

determine usage of each resource pool based on the location information of the resource pool to which the resources belong;

determine a priority of each resource pool based on usage of each resource pool; and determine that a resource pool with a highest priority is used by the apparatus to send the to-be-sent data; where usage of each resource pool includes any one of the following: each resource pool is simultaneously determined by a plurality of terminals, each resource pool is determined by one terminal, or each resource pool is not determined by any terminal.

Optionally, the determining module is specifically configured to:

when usage of each resource pool is that each resource pool is simultaneously determined by the plurality of terminals, determine that the priority of each resource pool is a first priority;

when usage of each resource pool is that each resource pool is determined by one terminal, determine that the priority of each resource pool is a second priority; or when usage of each resource pool is that each resource pool is not determined by any terminal, determine that the priority of each resource pool is a third priority; where both the first priority and the second priority are lower than the third priority.

Optionally, the determining module is specifically configured to:

determine usage of each resource pool based on the location information of the resource pool to which the resources belong and the location information of the resource pool determined by the apparatus and used to send the data;

determine a priority of each resource pool based on usage of each resource pool and the location information of the resource pool determined by the apparatus and used to send the data; and determine that a resource pool with a highest priority is used by the apparatus to send the data; where usage of each resource pool includes any one of the following: each resource pool is simultaneously determined by a plurality of terminals, each resource pool is determined by one terminal, or each resource pool is not determined by any terminal.

Optionally, the determining module is specifically configured to:

when usage of each resource pool is that each resource pool is simultaneously determined by the plurality of terminals, determine that the priority of each resource pool is a fourth priority; or when usage of each resource pool is that each resource pool is determined by one terminal, determine, based on the location information of the resource pool determined by the apparatus and used to send the data, whether the one terminal is the apparatus; and when determining that the one terminal is the apparatus, determine that the priority of each resource pool is a fifth priority; or when determining that the one terminal is not the apparatus, determine that the priority of each resource pool is a sixth priority; or when usage of each resource pool is that each resource pool is not determined by any terminal, determine that the priority of each resource pool is a seventh priority; where both the fourth priority and the sixth priority are lower than the fifth priority, and both the fourth priority and the sixth priority are lower than the seventh priority.

Optionally, the apparatus further includes an obtaining module, where the obtaining module is configured to obtain distance information and/or power information of each second terminal;

the determining module is further configured to determine, based on the distance information and/or the power information, at least one second terminal that meets preset conditions, where the distance information is a distance between the apparatus and each second terminal, a preset condition corresponding to the distance information is that the distance between the apparatus and each second terminal is less than a distance threshold, and a preset condition corresponding to the power information is that a power value of each second terminal is greater than a power threshold; and correspondingly, the determining module is specifically configured to:

determine, based on location information of a resource pool used by each of the at least one second terminal that meets the preset conditions to send to-be-sent data, the resource pool used by the apparatus to send the data.

Optionally, the apparatus further includes:

a sending module, configured to send a second message to a third terminal, where the second message includes usage of each resource pool, so that each third terminal determines, based on usage of each resource pool, a resource pool used by the third terminal to send data.

According to a fourth aspect, an embodiment of the present application provides a resource processing apparatus, including:

a receiving module, configured to receive a second message sent by each of at least one first terminal, where the second message includes usage of each resource pool, each resource pool includes a plurality of resources, usage of each resource pool is determined by the first terminal based on a first message simultaneously sent by each of at least one second terminal, the first message is carried on N resources in at least one resource pool, and N is a positive integer greater than or equal to 2; and a determining module, configured to determine, based on usage of each resource pool, a resource pool used by the apparatus to send data, and determine, from the determined resource pool, resources used by the apparatus to send the data.

Optionally, the determining module is specifically configured to:

when the apparatus has not determined the resource pool used to send the data, determine, based on usage of each resource pool, the resource pool used by the apparatus to send the data; or when the apparatus has determined the resource pool used to send the data, redetermine, based on usage of each resource pool and location information of the resource pool determined by the apparatus and used to send the data, a resource pool used by the apparatus to send the data.

Optionally, the determining module is specifically configured to:

determine a priority of each resource pool based on usage of each resource pool included in each second message; and determine that a resource pool with a highest priority is used by the apparatus to send the data; where usage of each resource pool includes any one of the following: each resource pool is simultaneously determined by a plurality of terminals, each resource pool is determined by one terminal, or each resource pool is not determined by any terminal.

Optionally, the determining module is specifically configured to:

when usage of each resource pool included in at least one second message is that each resource pool is simultaneously determined by the plurality of terminals, determine that the priority of each resource pool is a first priority;

when usage of each resource pool included in no second message is that each resource pool is simultaneously determined by the plurality of terminals, or usage of each resource pool included in at least one second message is that each resource pool is determined by one terminal, determine that the priority of each resource pool is a second priority; or when usage of each resource pool included in each second message is that each resource pool is not determined by any terminal, determine that the priority of each resource pool is a third priority; where both the first priority and the second priority are lower than the third priority.

Optionally, the determining module is specifically configured to:

determine a priority of each resource pool based on usage of each resource pool included in each second message and location information of at least one resource pool determined by the apparatus and used to send the to-be-sent data; and determine that a resource pool with a highest priority is used by the apparatus to send the to-be-sent data; where usage of each resource pool includes any one of the following: each resource pool is simultaneously determined by a plurality of terminals, each resource pool is determined by one terminal, or each resource pool is not determined by any terminal.

Optionally, the determining module is specifically configured to:

when usage of each resource pool included in at least one second message is that each resource pool is simultaneously determined by the plurality of terminals, determine that the priority of each resource pool is a fourth priority; or when usage of each resource pool included in no second message is that each resource pool is simultaneously determined by the plurality of terminals, or usage of each resource pool included in at least one second message is that each resource pool is determined by one terminal, determine, based on the location information of the at least one resource pool determined by the apparatus and used to send the to-be-sent data, whether the one terminal is the apparatus; and when determining that the one terminal is the apparatus, determine that the priority of each resource pool is a fifth priority; or when determining that the one terminal is not the apparatus, determine that the priority of each resource pool is a sixth priority; or when usage of each resource pool included in each second message is that each resource pool is not determined by any terminal, determine, by the apparatus, that the priority of each resource pool is a seventh priority; where the fourth priority and the sixth priority are lower than the fifth priority, and the fourth priority and the sixth priority are lower than the seventh priority.

Optionally, the apparatus further includes an obtaining module, where the obtaining module is configured to obtain distance information and/or power information of each first terminal;

the determining module is further configured to determine, based on the distance information and/or the power information, a first terminal that meets preset conditions, where the distance information is a distance between the apparatus and each first terminal, a preset condition corresponding to the distance information is that the distance between the apparatus and each first terminal is less than a distance threshold, and a preset condition corresponding to the power information is that a power value of each first terminal is greater than a power threshold; and correspondingly, the determining module is specifically configured to:

determine, based on usage of each resource pool included in a second message sent by the first terminal that meets the preset conditions, the resource pool used by the apparatus to send the data.

Optionally, the first message includes first indication information and second indication information, the first indication information is used to indicate location information of a resource pool used by each second terminal to send current data, and the second indication information is used to indicate an offset of the location information of the resource pool used to send the current data, to a resource pool in which to-be-sent data of each second terminal is located.

According to a fifth aspect, an embodiment of the present application provides a terminal, including:

a receiver, configured to receive a first message simultaneously sent by each of at least one second terminal, where the first message is carried on N resources and used to indicate location information of resources on which to-be-sent data is located, and N is a positive integer greater than or equal to 2; and a processor, configured to determine, based on the location information of the resources on which the to-be-sent data is located, resources used by the terminal to send data.

Optionally, the first message is carried on the N resources in at least one resource pool;

the location information of the resources on which the to-be-sent data is located is location information of a resource pool to which the resources belong, and each resource pool includes a plurality of resources; and correspondingly, the processor is specifically configured to:

determine, based on the location information of the resource pool to which the resources belong, a resource pool used by the terminal to send the data; and determine, from the determined resource pool, the resources used by the terminal to send the data.

Optionally, the processor is specifically configured to:

when the terminal has not determined the resource pool used to send the data, determine, based on the location information of the resource pool to which the resources belong, the resource pool used by the terminal to send the data; or when the terminal has determined the resource pool used to send the data, redetermine, based on the location information of the resource pool to which the resources belong and location information of the resource pool determined by the terminal and used to send the data, a resource pool used by the terminal to send the data.

Optionally, the processor is specifically configured to:

determine usage of each resource pool based on the location information of the resource pool to which the resources belong;

determine a priority of each resource pool based on usage of each resource pool; and determine that a resource pool with a highest priority is used by the terminal to send the to-be-sent data; where usage of each resource pool includes any one of the following: each resource pool is simultaneously determined by a plurality of terminals, each resource pool is determined by one terminal, or each resource pool is not determined by any terminal.

Optionally, the processor is specifically configured to:

when usage of each resource pool is that each resource pool is simultaneously determined by the plurality of terminals, determine that the priority of each resource pool is a first priority;

when usage of each resource pool is that each resource pool is determined by one terminal, determine that the priority of each resource pool is a second priority; or when usage of each resource pool is that each resource pool is not determined by any terminal, determine that the priority of each resource pool is a third priority; where both the first priority and the second priority are lower than the third priority.

Optionally, the processor is specifically configured to:

determine usage of each resource pool based on the location information of the resource pool to which the resources belong and the location information of the resource pool determined by the terminal and used to send the data;

determine a priority of each resource pool based on usage of each resource pool and the location information of the resource pool determined by the terminal and used to send the data; and determine that a resource pool with a highest priority is used by the terminal to send the data; where usage of each resource pool includes any one of the following: each resource pool is simultaneously determined by a plurality of terminals, each resource pool is determined by one terminal, or each resource pool is not determined by any terminal.

Optionally, the processor is specifically configured to:

when usage of each resource pool is that each resource pool is simultaneously determined by the plurality of terminals, determine that the priority of each resource pool is a fourth priority; or when usage of each resource pool is that each resource pool is determined by one terminal, determine, based on the location information of the resource pool determined by the terminal and used to send the data, whether the one terminal is the terminal; and when determining that the one terminal is the terminal, determine that the priority of each resource pool is a fifth priority; or when determining that the one terminal is not the terminal, determine that the priority of each resource pool is a sixth priority; or when usage of each resource pool is that each resource pool is not determined by any terminal, determine that the priority of each resource pool is a seventh priority; where both the fourth priority and the sixth priority are lower than the fifth priority, and both the fourth priority and the sixth priority are lower than the seventh priority.

Optionally, the processor is further configured to:

obtain distance information and/or power information of each second terminal; and determine, based on the distance information and/or the power information, at least one second terminal that meets preset conditions, where the distance information is a distance between the terminal and each second terminal, a preset condition corresponding to the distance information is that the distance between the terminal and each second terminal is less than a distance threshold, and a preset condition corresponding to the power information is that a power value of each second terminal is greater than a power threshold; and correspondingly, the processor is specifically configured to:

determine, based on location information of a resource pool used by each of the at least one second terminal that meets the preset conditions to send to-be-sent data, the resource pool used by the terminal to send the data.

Optionally, the terminal further includes:

a transmitter, configured to send a second message to a third terminal, where the second message includes usage of each resource pool, so that each third terminal determines, based on usage of each resource pool, a resource pool used by the third terminal to send data.

According to a sixth aspect, an embodiment of the present application provides a terminal, including:

a receiver, configured to receive a second message sent by each of at least one first terminal, where the second message includes usage of each resource pool, each resource pool includes a plurality of resources, usage of each resource pool is determined by the first terminal based on a first message simultaneously sent by each of at least one second terminal, the first message is carried on N resources in at least one resource pool, and N is a positive integer greater than or equal to 2; and a processor, configured to determine, based on usage of each resource pool, a resource pool used by the terminal to send data, and determine, from the determined resource pool, resources used by the terminal to send the data.

Optionally, the processor is specifically configured to:

when the terminal has not determined the resource pool used to send the data, determine, based on usage of each resource pool, the resource pool used by the terminal to send the data; or when the terminal has determined the resource pool used to send the data, redetermine, based on usage of each resource pool and location information of the resource pool determined by the terminal and used to send the data, a resource pool used by the terminal to send the data.

Optionally, the processor is specifically configured to:

determine a priority of each resource pool based on usage of each resource pool included in each second message; and determine that a resource pool with a highest priority is used by the terminal to send the data; where usage of each resource pool includes any one of the following: each resource pool is simultaneously determined by a plurality of terminals, each resource pool is determined by one terminal, or each resource pool is not determined by any terminal.

Optionally, the processor is specifically configured to:

when usage of each resource pool included in at least one second message is that each resource pool is simultaneously determined by the plurality of terminals, determine that the priority of each resource pool is a first priority;

when usage of each resource pool included in no second message is that each resource pool is simultaneously determined by the plurality of terminals, or usage of each resource pool included in at least one second message is that each resource pool is determined by one terminal, determine that the priority of each resource pool is a second priority; or when usage of each resource pool included in each second message is that each resource pool is not determined by any terminal, determine that the priority of each resource pool is a third priority; where both the first priority and the second priority are lower than the third priority.

Optionally, the processor is specifically configured to:

determine a priority of each resource pool based on usage of each resource pool included in each second message and location information of at least one resource pool determined by the terminal and used to send the to-be-sent data; and determine that a resource pool with a highest priority is used by the terminal to send the to-be-sent data; where usage of each resource pool includes any one of the following: each resource pool is simultaneously determined by a plurality of terminals, each resource pool is determined by one terminal, or each resource pool is not determined by any terminal.

Optionally, the processor is specifically configured to:

when usage of each resource pool included in at least one second message is that each resource pool is simultaneously determined by the plurality of terminals, determine that the priority of each resource pool is a fourth priority; or when usage of each resource pool included in no second message is that each resource pool is simultaneously determined by the plurality of terminals, or usage of each resource pool included in at least one second message is that each resource pool is determined by one terminal, determine, based on the location information of the at least one resource pool determined by the terminal and used to send the to-be-sent data, whether the one terminal is the terminal; and when determining that the one terminal is the terminal, determine that the priority of each resource pool is a fifth priority; or when determining that the one terminal is not the terminal, determine that the priority of each resource pool is a sixth priority; or when usage of each resource pool included in each second message is that each resource pool is not determined by any terminal, determine, by the terminal, that the priority of each resource pool is a seventh priority; where the fourth priority and the sixth priority are lower than the fifth priority, and the fourth priority and the sixth priority are lower than the seventh priority.

Optionally, the processor is further configured to:

obtain distance information and/or power information of each first terminal; and determine, based on the distance information and/or the power information, a first terminal that meets preset conditions, where the distance information is a distance between the terminal and each first terminal, a preset condition corresponding to the distance information is that the distance between the terminal and each first terminal is less than a distance threshold, and a preset condition corresponding to the power information is that a power value of each first terminal is greater than a power threshold; and correspondingly, the processor is specifically configured to:

determine, based on usage of each resource pool included in a second message sent by the first terminal that meets the preset conditions, the resource pool used by the terminal to send the data.

Optionally, the first message includes first indication information and second indication information, the first indication information is used to indicate location information of a resource pool used by each second terminal to send current data, and the second indication information is used to indicate an offset of the location information of the resource pool used to send the current data, to a resource pool in which to-be-sent data of each second terminal is located.

The embodiments of the present application provide a resource processing method, an apparatus, and a terminal. Because the first message is carried on the N resources, a probability of collision of the resources used by the second terminal to send the first message is very low. On this basis, the first terminal easily learns the resources determined by the second terminal, and therefore can accurately determine, based on the resources determined by the second terminal, the resources used by the first terminal to send the data. This further avoids collision between the resources used by the first terminal to send the data and the resources used by the second terminal to send the to-be-sent data, and improves reliability of a V2X system.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

The embodiments of the present application provide a resource processing method, an apparatus, and a terminal to resolve the following problem in the prior art: When a terminal 1 and a terminal 2 simultaneously send resource indication messages on a same resource, due to resource collision, a terminal 3 possibly cannot detect the resource indication messages of the terminal 1 and the terminal 2, or a terminal 3 can detect a resource indication message of only one terminal, and therefore the terminal 3 cannot accurately determine a resource used to send to-be-sent data, and reliability of a V2X system is relatively low.

Figure 1A:
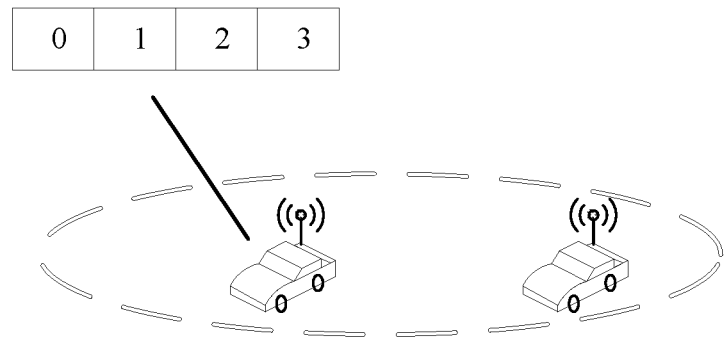
FIG. 1A is a schematic diagram for determining a resource by a terminal 1 according to the prior art.
Figure 1B:
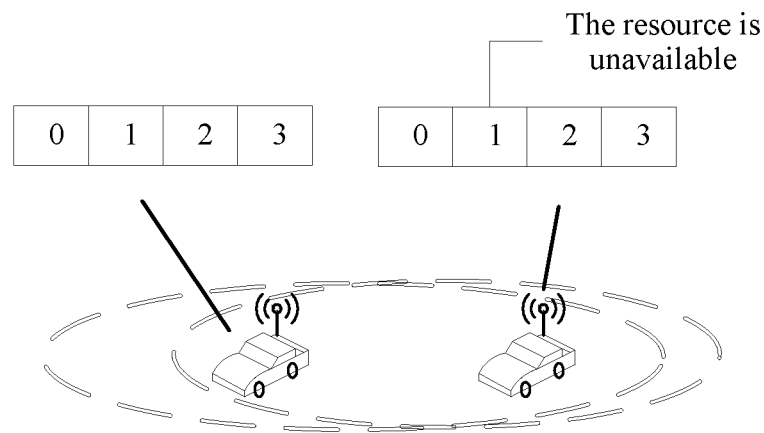
FIG. 1B is a schematic diagram for determining a resource by a terminal 2 according to the prior art.
Figure 2:
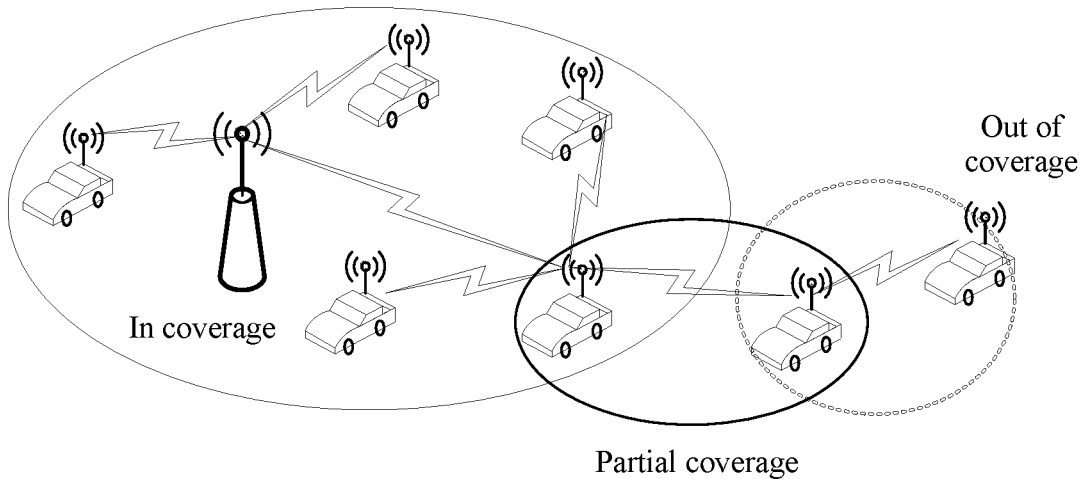
FIG. 2 is a schematic diagram of a direct communication scenario according to an embodiment of the present application.

The embodiments of the present application are applied to a V2X system based on an LTE technology. The system includes a base station and a plurality of terminals, and mainly completes direct communication between terminals. FIG. 2 is a schematic diagram of a direct communication scenario according to an embodiment of the present application. As shown in FIG. 2, three main direct communication scenarios are respectively as follows: A first scenario is an in-coverage (in-coverage) scenario, and in this scenario, terminals are all located within coverage of a base station, and the base station may assist in scheduling resources. A second scenario is an out-of-coverage (out-of-coverage) scenario, that is, out of coverage of any base station, and in this case, a terminal may autonomously select a resource. A third scenario is a partial-coverage (partial-coverage) scenario, and in this case, a base station assists in scheduling resources for some terminals, but some terminals autonomously select resources.

Figure 3:
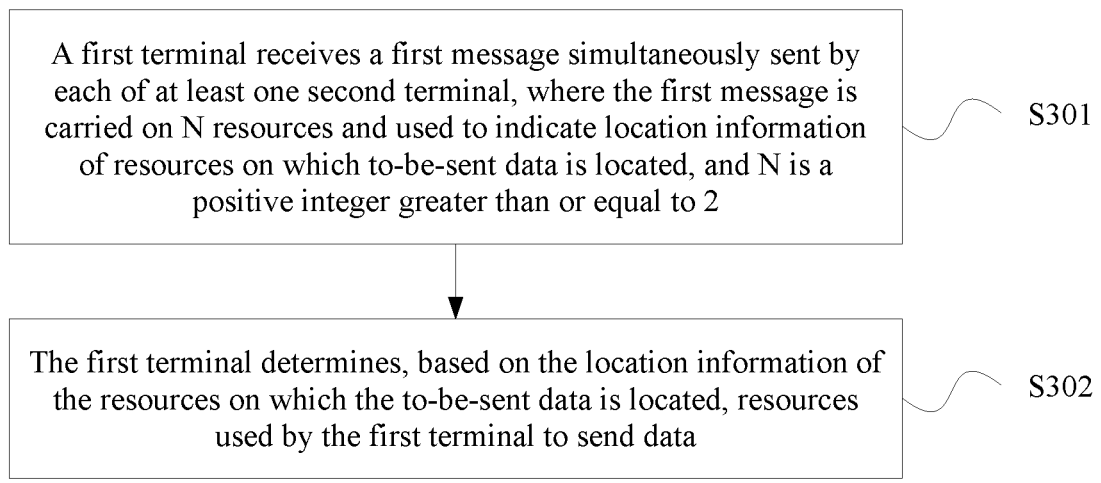
FIG. 3 is a flowchart of a resource processing method according to an embodiment of the present application.

FIG. 3 is a flowchart of a resource processing method according to an embodiment of the present application. The method is performed by a first terminal, where the first terminal may be a vehicle, a computer, a mobile phone, an RSU, or the like. The method includes the following procedure.

Step S301: A first terminal receives a first message simultaneously sent by each of at least one second terminal, where the first message is carried on N resources and used to indicate location information of resources on which to-be-sent data is located, and N is a positive integer greater than or equal to 2.

Figure 4A:
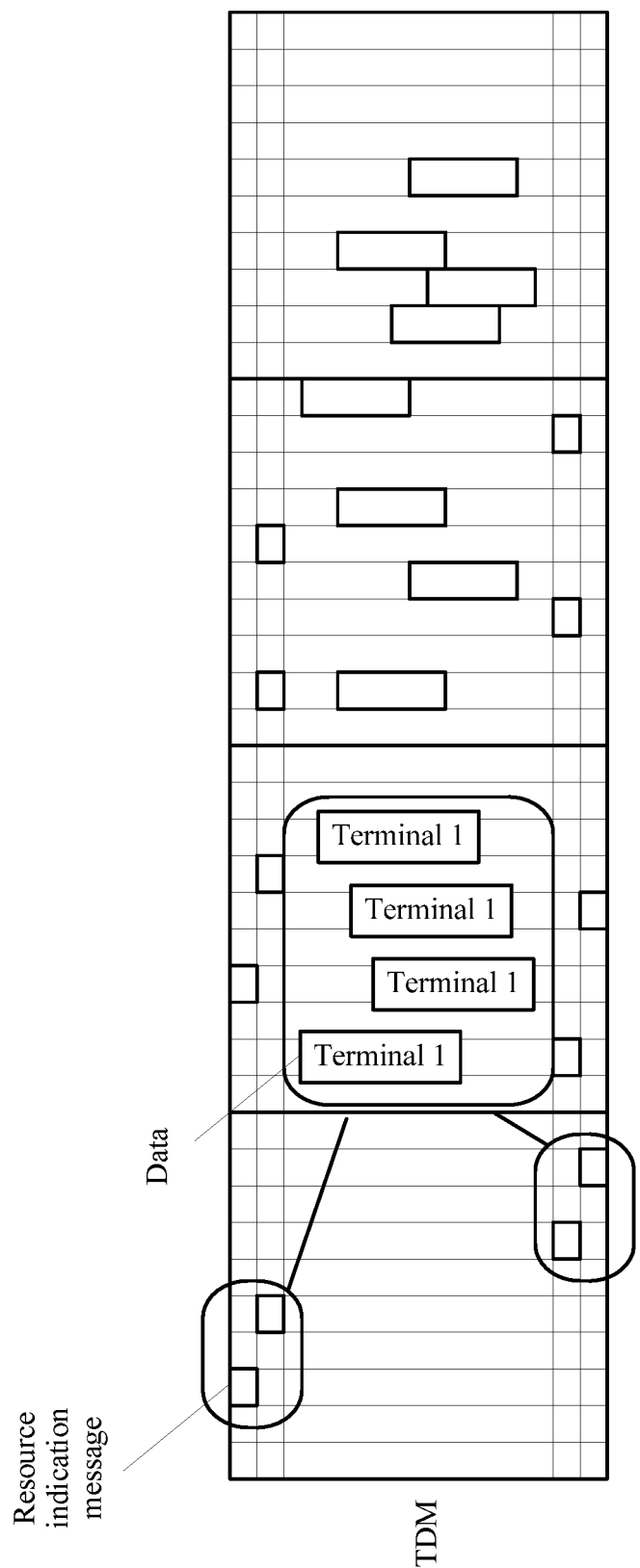
FIG. 4A to FIG. 4C are schematic diagrams of resource usage according to an embodiment of the present application.
Figure 4B:
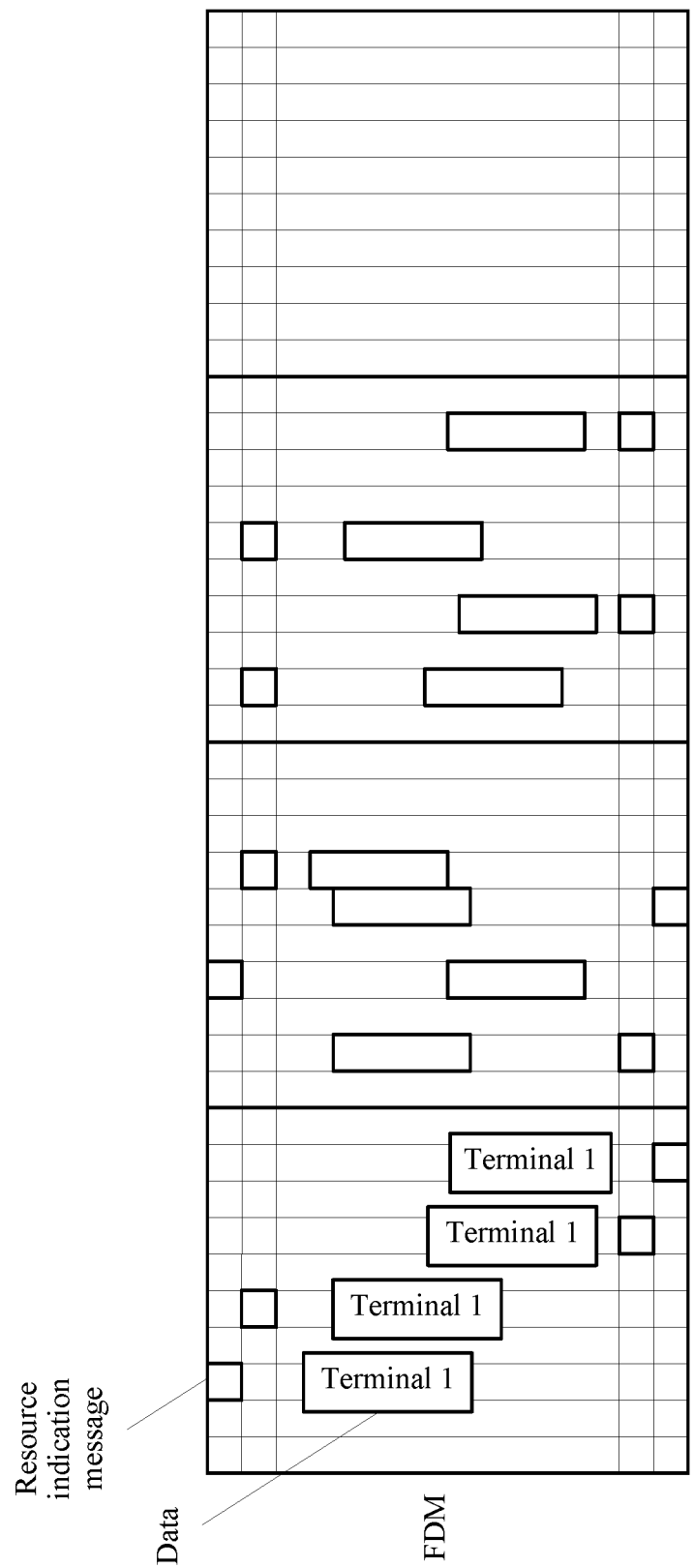
Figure 4C:
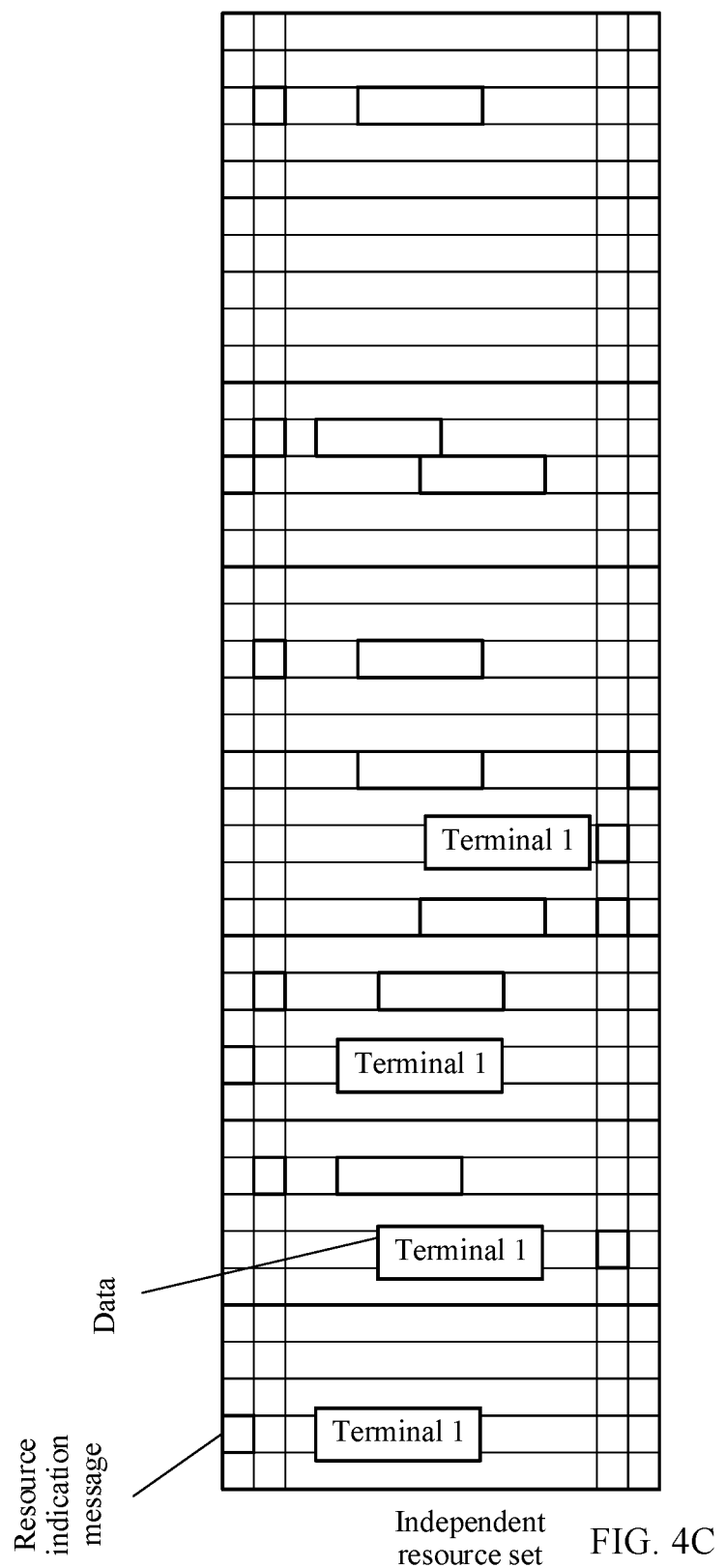

That the first message is carried on N resources means that the second terminal sends the first message on each of the N resources. FIG. 4A to FIG. 4C are schematic diagrams of resource usage according to an embodiment of the present application. As shown in FIG. 4A, when a terminal sends to-be-sent data and a first message, a frequency division multiplexing (FDM) mode is used; for example, a frequency band used by a terminal 1 to send to-be-sent data is different from a frequency band used by the terminal 1 to send a first message. As shown in FIG. 4B, when a terminal sends to-be-sent data and a first message, a time division multiplexing (TDM) mode is used; for example, time domain resources used by a terminal 1 to send to-be-sent data are different from time domain resources used by the terminal 1 to send a first message. As shown in FIG. 4C, assuming that each column in FIG. 4C is a resource pool, and assuming that several resource pools form a resource set, a same terminal is allowed to send to-be-sent data and a first message on a resource set at most once only; for example, on a first resource set, a terminal 1 sends to-be-sent data and a first message only once, and on a second resource set, the terminal 1 sends to-be-sent data and a first message only once, and a terminal 2 also sends to-be-sent data and a first message only once.

Step S302: The first terminal determines, based on the location information of the resources on which the to-be-sent data is located, resources used by the first terminal to send data.

A principle of determining, by the first terminal, the resources used by the first terminal to send the to-be-sent data is: the first terminal avoids, as much as possible, the resources determined by each second terminal and used to send the to-be-sent data.

Figure 5A:
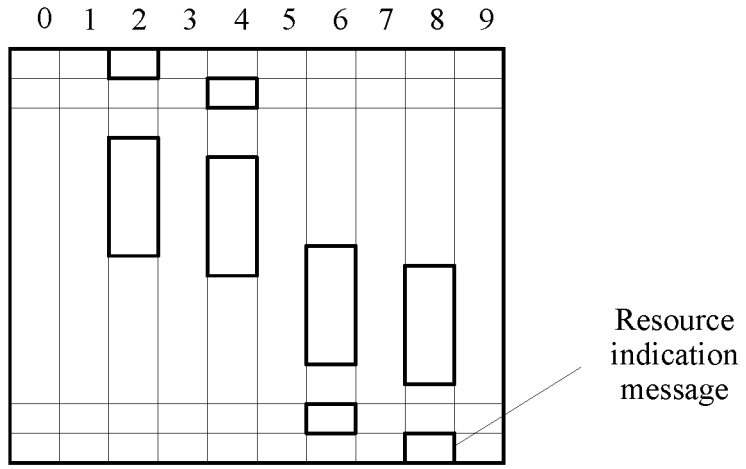
FIG. 5A is a schematic diagram of usage of resources corresponding to a terminal 1 and used to send a first message according to an embodiment of the present application.
Figure 5B:
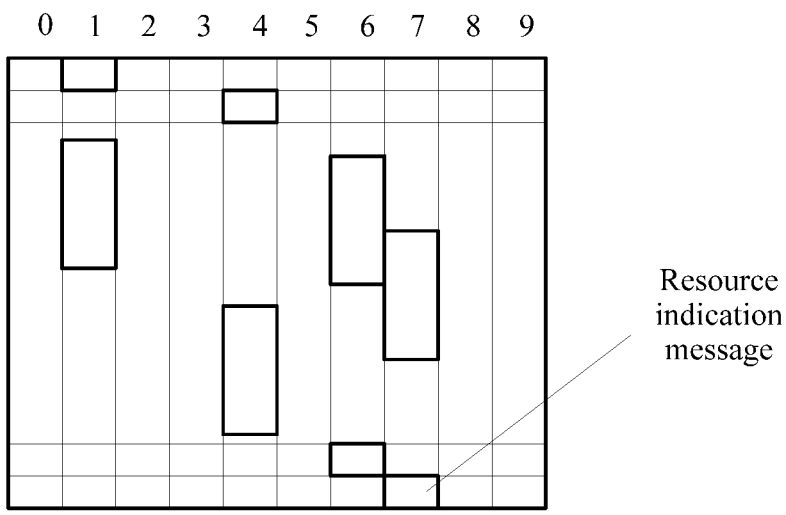
FIG. 5B is a schematic diagram of usage of resources corresponding to a terminal 2 and used to send a first message according to an embodiment of the present application.

An example is used with reference to step S301 and step S302. Specifically, FIG. 5A is a schematic diagram of usage of resources corresponding to a terminal 1 and used to send a first message according to an embodiment of the present application. FIG. 5B is a schematic diagram of usage of resources corresponding to a terminal 2 and used to send a first message according to an embodiment of the present application. Herein both the terminal 1 and the terminal 2 are the foregoing second terminals, and N resources selected by the terminal 1 are not completely the same as N resources selected by the terminal 2. Therefore, a probability of collision of resources is very low. On this basis, the first terminal easily receives first messages sent by the terminal 1 and the terminal 2, to learn location information of resources that are respectively determined by the terminal 1 and the terminal 2 and used to send to-be-sent data. The first terminal can determine, on this basis, resources used by the first terminal to send data. This further avoids collision of resources used to send to-be-sent data.

In this embodiment of the present application, because the first message is carried on the N resources, a probability of collision of the resources used by the second terminal to send the first message is very low. On this basis, the first terminal easily learns the resources determined by the second terminal, and therefore can accurately determine, based on the resources determined by the second terminal, the resources used by the first terminal to send the data. This further avoids collision between the resources used by the first terminal to send the data and the resources used by the second terminal to send the to-be-sent data, and improves reliability of a V2X system.

Optionally, the first message is carried on the N resources in at least one resource pool; the location information of the resources on which the to-be-sent data is located is location information of a resource pool to which the resources belong; and each resource pool may use all available frequency domain resources, or use some frequency domain resources, and each response pool includes a plurality of resources, where the resources may be resource blocks RBs, or may be resource elements REs.

For example, as shown in FIG. 5A and FIG. 5B, both the terminal 1 and the terminal 2 are the foregoing second terminals. The terminal 1 sends a first message on N resources in resource pools 2, 4, 6, and 8, and the terminal 2 sends a first message on N resources in resource pools 1, 4, 6, and 7. When the terminal 1 and the terminal 2 send the first messages simultaneously, although the resource pools 4 and 6 are the same for the terminal 1 and the terminal 2, because the terminal 1 sends the first message on the N resources in the resource pools 2, 4, 6, and 8, and the terminal 2 sends the first message on the N resources in the resource pools 1, 4, 6, and 7, a probability of collision of resources is very low.

Based on a concept of the resource pool, the first message may be in any one of the following three forms.

First form: The first message includes first indication information and second indication information, the first indication information is used to indicate location information of a resource pool used by each second terminal to send current data, and the second indication information is used to indicate an offset of the location information of the resource pool used to send the current data, to a resource pool in which to-be-sent data of each second terminal is located. Based on FIG. 4C, assuming that first indication information corresponding to the terminal 1 indicates that location information of a resource pool used by the terminal 1 to send current data is a second resource pool in the first resource set (actually, a plurality of resource pools may be used by the terminal 1 to send the current data, and FIG. 4C merely shows an example in which only one resource pool is used), and that second indication information corresponding to the terminal 1 is used to indicate an offset 5 of the location information of the resource pool used to send the current data, to a resource pool in which to-be-sent data of each second terminal is located, it may be determined that a resource pool used by the terminal 1 to send to-be-sent data is a first resource pool in the second resource set.

Second form: The first message includes first indication information and third indication information, the first indication information is used to indicate location information of a resource pool used by each second terminal to send current data, and the third indication information is directly used to indicate location information of a resource pool used to send to-be-sent data.

Third form: The first message includes only the first indication information, and the first indication information is used to indicate location information of a resource pool used by each second terminal to send current data. In this case, by default, location information of a resource pool used by the second terminal to send to-be-sent data is the same as the location information of the resource pool used by the second terminal to send the current data.

Based on the concept of the resource pool, correspondingly, that the first terminal determines, based on the location information of the resources on which the to-be-sent data is located, resources used by the first terminal to send data includes:

the first terminal determines, based on the location information of the resource pool to which the resources belong, a resource pool used by the first terminal to send the data; and the first terminal determines, from the determined resource pool, the resources used by the first terminal to send the data.

For example, first, the first terminal may determine a priority of each resource pool based on location information of a resource pool determined by each second terminal and used to send the to-be-sent data, and then select a resource pool with a highest priority for the first terminal to send the to-be-sent data; or may determine a priority of each resource pool based on location information of a resource pool determined by each second terminal and used to send the to-be-sent data, and then randomly select, from resource pools whose priorities are higher than a preset value, a resource pool for the first terminal to send the to-be-sent data; and then the first terminal may randomly select, from the determined resource pool, N resources used to send the to-be-sent data.

Optionally, after determining the resources used by the first terminal to send the to-be-sent data, the first terminal may send a request message to a base station, to request the base station to schedule the resources for the first terminal to send the to-be-sent data.

In this embodiment of the present application, because the first message is carried on the N resources in the at least one resource pool, a probability of collision of the resource pool used by the second terminal to send the first message is very low. On this basis, the first terminal easily learns the resource pool used by the second terminal to send the data, and therefore, can determine the resource pool used by the first terminal to send the data, and select, from the resource pool, the resources used to send the data, to avoid collision between the selected resources and the resources used by the second terminal to send the to-be-sent data, and further improve reliability of the V2X system.

Optionally, that the first terminal determines, based on the location information of the resource pool to which the resources belong, a resource pool used by the first terminal to send the data includes two cases.

First case: When the first terminal has not determined the resource pool used to send the data, the first terminal determines, based on the location information of the resource pool to which the resources belong, the resource pool used by the first terminal to send the data.

Second case: When the first terminal has determined the resource pool used to send the data, the first terminal redetermines, based on the location information of the resource pool to which the resources belong and location information of the resource pool that has been determined by the first terminal and is used to send the data, a resource pool used by the first terminal to send the data.

Figure 6:
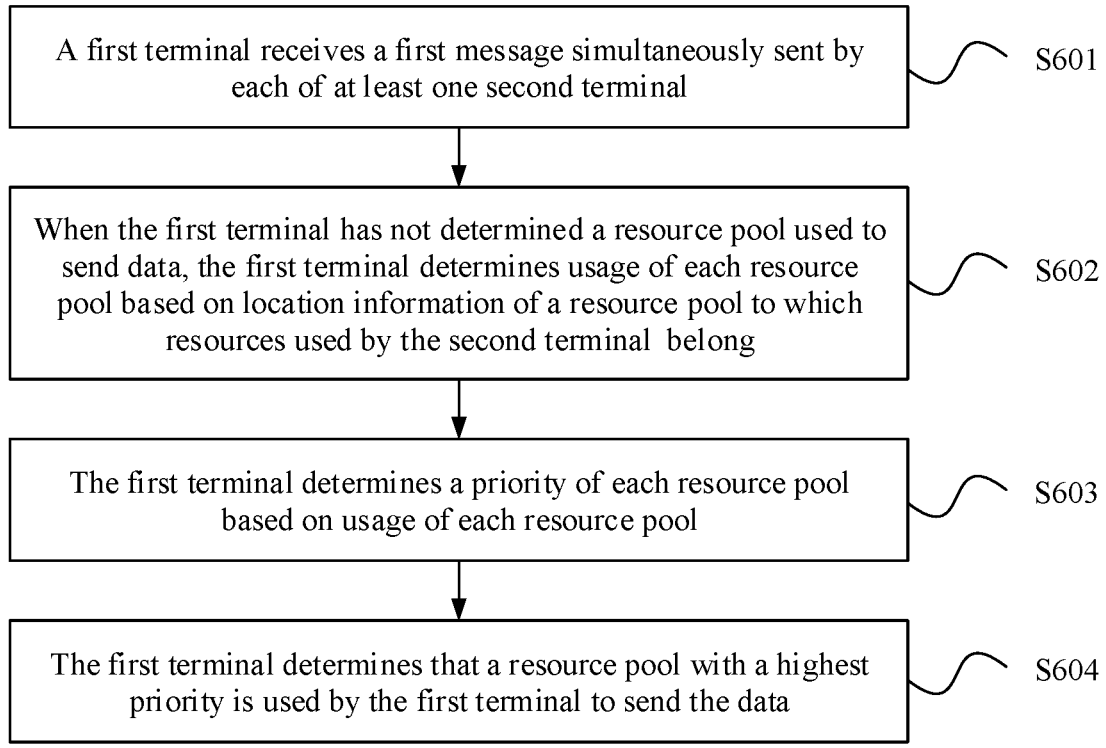
FIG. 6 is a flowchart of a resource processing method according to another embodiment of the present application.

The following describes the first case in detail. FIG. 6 is a flowchart of a resource processing method according to another embodiment of the present application. The method is performed by a first terminal. The method includes the following procedure.

Step S601: A first terminal receives a first message simultaneously sent by each of at least one second terminal.

Step S601 is the same as step S301, and is not described again herein.

Step S602: When the first terminal has not determined a resource pool used to send data, the first terminal determines usage of each resource pool based on location information of a resource pool to which resources used by the second terminal belong.

Usage of each resource pool includes any one of the following: each resource pool is simultaneously determined by a plurality of terminals, each resource pool is determined by one terminal, or each resource pool is not determined by any terminal.

Step S603: The first terminal determines a priority of each resource pool based on usage of each resource pool.

When usage of each resource pool is that each resource pool is simultaneously determined by the plurality of terminals, the first terminal determines that the priority of each resource pool is a first priority;

when usage of each resource pool is that each resource pool is determined by one terminal, the first terminal determines that the priority of each resource pool is a second priority; or when usage of each resource pool is that each resource pool is not determined by any terminal, the first terminal determines that the priority of each resource pool is a third priority.

Both the first priority and the second priority are lower than the third priority, and the first priority may be higher than the second priority or may be lower than the second priority. This is not limited in this embodiment of the present application.

A reason why the first terminal sets priorities is as follows: Because a lot of second terminals contend for determining resource pools, the first terminal fails to determine a resource pool, but still reserves the first messages. If the resource pools are avoided during reselection, available resource pools are reduced, resulting in waste of resource pools. However, if the resource pools are directly used, the first terminal may fail to perform determining. Therefore, when usage is that each resource pool is simultaneously determined by the plurality of terminals, the first terminal determines that the priority of each resource pool is the first priority. The first terminal does not use a resource pool that is successfully determined by the second terminal. For example, each resource pool is determined by a terminal, and the priority thereof is set to the second priority. Therefore, performance of the second terminal that successfully determines the resource pool is ensured. When usage of each resource pool is that each resource pool is not determined by any terminal, the first terminal determines that the priority of each resource pool is the third priority.

Step S604: The first terminal determines that a resource pool with a highest priority is used by the first terminal to send the data.

An example is used for description with reference to step S601 to step S604. As shown in FIG. 5A and FIG. 5B, assuming that resource pools determined by a terminal 1 and used to send to-be-sent data are 2, 4, 6, and 8, and that resource pools determined by a terminal 2 and used to send to-be-sent data are 1, 4, 6, and 7, and assuming that no other terminals determine the resource pools 1, 2, 4, 6, 7, and 8, the first terminal determines that usage of all the resource pools 1, 2, 7, and 8 is that the resource pools are determined by one terminal, and corresponding priorities are the second priority; usage of the resource pools 4 and 6 is that the resource pools are simultaneously determined by a plurality of terminals, and specifically simultaneously determined by two terminals, and corresponding priorities are the first priority; other resource pools such as 0, 3, 5, and 9 are not determined by any terminal, and corresponding priorities are the third priority. Therefore, the first terminal determines that some or all of the resource pools 0, 3, 5, and 9 of the highest priority are used by the first terminal to send the data.

Optionally, before the first terminal determines, based on the location information of the resource pool to which the resources belong, a resource pool used by the first terminal to send the data, the method further includes:

the first terminal obtains distance information and/or power information of each second terminal, where the distance information is determined by obtaining current location information of the first terminal and current location information of the second terminal; and the first terminal determines, based on the distance information and/or the power information, at least one second terminal that meets preset conditions, where the distance information is a distance between the first terminal and each second terminal, a preset condition corresponding to the distance information is that the distance between the first terminal and each second terminal is less than a distance threshold, and a preset condition corresponding to the power information is that a power value of each second terminal is greater than a power threshold; and correspondingly, that the first terminal determines, based on the location information of the resource pool to which the resources belong, a resource pool used by the first terminal to send the data includes: the first terminal determines, based on location information of a resource pool used by each of the at least one second terminal that meets the preset conditions to send to-be-sent data, the resource pool used by the first terminal to send the data.

In other words, before the first terminal determines, based on the location information of the resource pool to which the resources belong, the resource pool used by the first terminal to send the data, the first terminal needs to filter the first message sent by the second terminal. Filtering can increase a convergence rate of resource processing and therefore improve system performance of a V2X system.

Further, if the first terminal finds that current resource utilization is lower than a first threshold, the distance threshold may be increased or the power threshold may be reduced, so that sufficient second terminals meet the preset conditions and that resource utilization is improved; correspondingly, when current resource utilization is higher than a second threshold, the distance threshold may be reduced or the power threshold may be increased, so that few second terminals meet the preset conditions and that the convergence rate of resource processing is increased.

Figure 7:
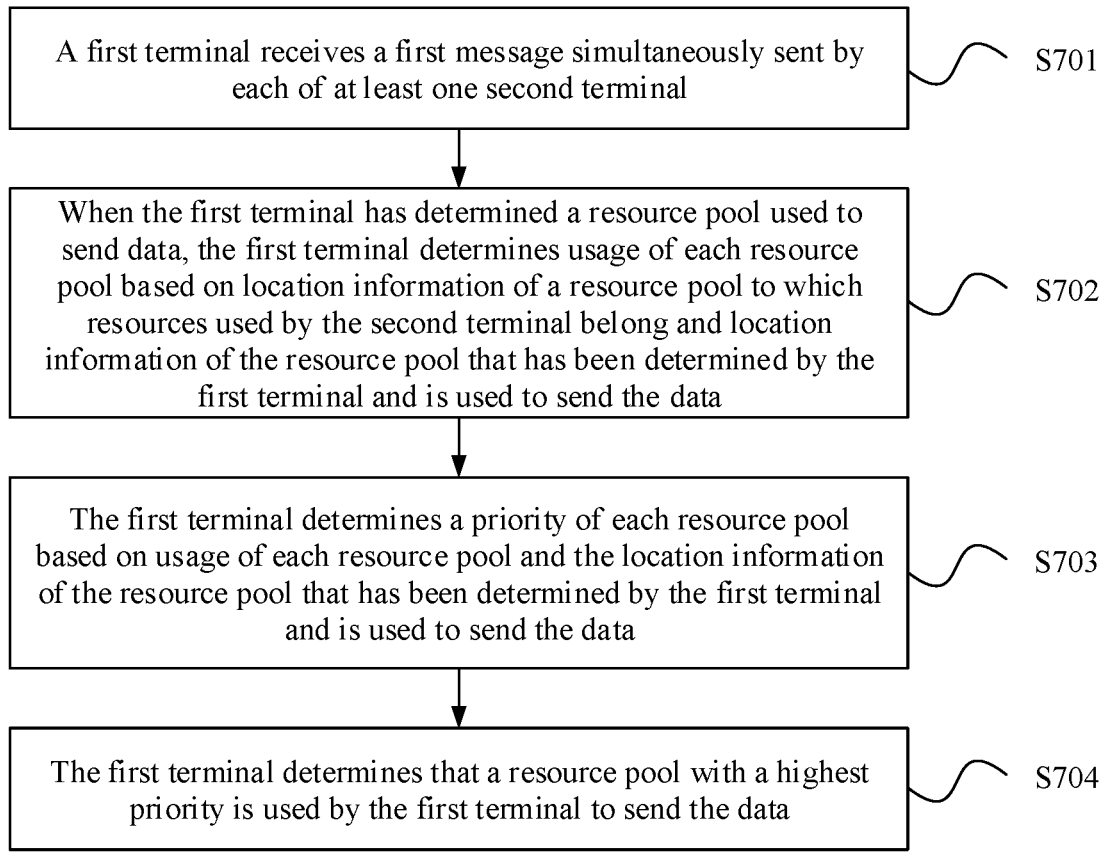
FIG. 7 is a flowchart of a resource processing method according to still another embodiment of the present application.

The following describes the second case in detail. FIG. 7 is a flowchart of a resource processing method according to still another embodiment of the present application. The method is performed by a first terminal. The method includes the following procedure.

Step S701: A first terminal receives a first message simultaneously sent by each of at least one second terminal.

Step S701 is the same as step S301, and is not described again herein.

Step S702: When the first terminal has determined a resource pool used to send data, the first terminal determines usage of each resource pool based on location information of a resource pool to which resources used by the second terminal belong and location information of the resource pool that has been determined by the first terminal and is used to send the data.

Usage of each resource pool includes any one of the following: each resource pool is simultaneously determined by a plurality of terminals, each resource pool is determined by one terminal, or each resource pool is not determined by any terminal.

Step S703: The first terminal determines a priority of each resource pool based on usage of each resource pool and the location information of the resource pool that has been determined by the first terminal and is used to send the data.

When usage of each resource pool is that each resource pool is simultaneously determined by the plurality of terminals, the first terminal determines that the priority of each resource pool is a fourth priority; or when usage of each resource pool is that each resource pool is determined by one terminal, the first terminal determines, based on the location information of the resource pool that has been determined by the first terminal and is used to send the data, whether the one terminal is the first terminal; and when the first terminal determines that the one terminal is the first terminal, the first terminal determines that the priority of each resource pool is a fifth priority; or when the first terminal determines that the one terminal is not the first terminal, the first terminal determines that the priority of each resource pool is a sixth priority; or when usage of each resource pool is that each resource pool is not determined by any terminal, the first terminal determines that the priority of each resource pool is a seventh priority.

Both the fourth priority and the sixth priority are lower than the fifth priority, and both the fourth priority and the sixth priority are lower than the seventh priority. The fourth priority may be higher than the sixth priority, or may be lower than the sixth priority. This is not limited in this embodiment of the present application.

A reason why the first terminal sets priorities is as follows: Because a lot of second terminals contend for determining resource pools, the first terminal fails to determine a resource pool, but still reserves the first messages. If the resource pools are avoided during reselection, available resource pools are reduced, resulting in waste of resource pools. However, if the resource pools are directly used, the first terminal may fail to perform determining. Therefore, when usage is that each resource pool is simultaneously determined by the plurality of terminals, the first terminal determines that the priority of each resource pool is the fourth priority. When the first terminal determines that the first terminal determines a resource pool successfully, the first terminal determines that a priority of the determined resource pool is the fifth priority. The first terminal does not use the resource pool successfully determined by the second terminal. For example, if each resource pool is determined by one terminal, and the one terminal is the second terminal, it indicates that the first terminal fails to determine a resource pool. In this case, a priority of the resource pool is set to the sixth priority. Therefore, performance of the second terminal that successfully determines the resource pool is ensured. When usage of each resource pool is that each resource pool is not determined by any terminal, the first terminal determines that the priority of each resource pool is the seventh priority.

Step S704: The first terminal determines that a resource pool with a highest priority is used by the first terminal to send the data.

Figure 5C:
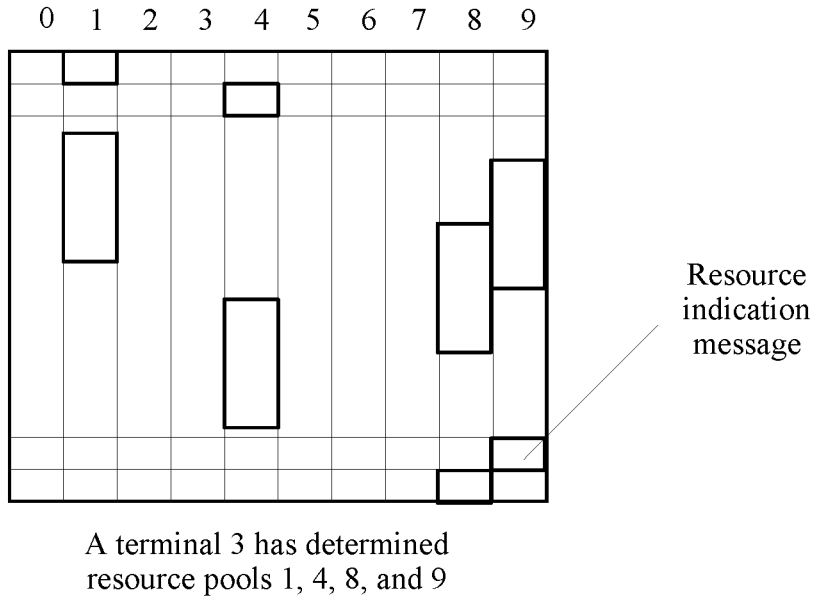
FIG. 5C is a schematic diagram for determining a corresponding resource pool by a terminal 3 according to an embodiment of the present application.

An example is used for description with reference to step S701 to step S704. FIG. 5C is a schematic diagram for determining a corresponding resource pool by a terminal 3 according to an embodiment of the present application. As shown in FIG. 5A and FIG. 5B, assuming that resource pools determined by a terminal 1 and used to send to-be-sent data are 2, 4, 6, and 8, and that resource pools determined by a terminal 2 and used to send to-be-sent data are 1, 4, 6, and 7, and that the terminal 3 (used as the first terminal) has determined resource pools 1, 4, 8, and 9, the terminal 3 determines that the resource pools 1, 4, 6, and 8 are simultaneously determined by a plurality of terminals, and sets priorities of the resource pools to be the fourth priority; the terminal 3 determines that usage of the resource pool 9 is that the resource pool is determined by one terminal, and the one terminal is the terminal 3, and in this case, a priority of the resource pool 9 is the fifth priority; the terminal 3 determines that usage of both the resource pools 2 and 7 is that the resource pools are determined by one terminal, and the one terminal is the terminal 1 and the terminal 2 respectively, and in this case, priorities of the resource pools 2 and 7 are the sixth priority; other resource pools such as 0, 3, and 5 are not determined by any terminal, and corresponding priorities are the seventh priority. Therefore, the terminal 3 determines that some or all of the resource pools 0, 3, and 5 of the highest priority are used by the terminal 3 to send data.

Optionally, before the first terminal determines, based on the location information of the resource pool to which the resources belong, a resource pool used by the first terminal to send the data, the method further includes:

the first terminal obtains distance information and/or power information of each second terminal; and the first terminal determines, based on the distance information and/or the power information, at least one second terminal that meets preset conditions, where the distance information is a distance between the first terminal and each second terminal, a preset condition corresponding to the distance information is that the distance between the first terminal and each second terminal is less than a distance threshold, and a preset condition corresponding to the power information is that a power value of each second terminal is greater than a power threshold; and correspondingly, that the first terminal determines, based on the location information of the resource pool to which the resources belong, a resource pool used by the first terminal to send the data includes: the first terminal determines, based on location information of a resource pool used by each of the at least one second terminal that meets the preset conditions to send to-be-sent data, the resource pool used by the first terminal to send the data.

In other words, before the first terminal determines, based on the location information of the resource pool to which the resources belong, the resource pool used by the first terminal to send the data, the first terminal needs to filter the first message sent by the second terminal. Filtering can increase a convergence rate of resource processing and therefore improve system performance of a V2X system.

Further, if the first terminal finds that current resource utilization is lower than a first threshold, the distance threshold may be increased or the power threshold may be reduced, so that sufficient second terminals meet the preset conditions and that resource utilization is improved; correspondingly, when current resource utilization is higher than a second threshold, the distance threshold may be reduced or the power threshold may be increased, so that few second terminals meet the preset conditions and that the convergence rate of resource processing is increased.

Figure 8:
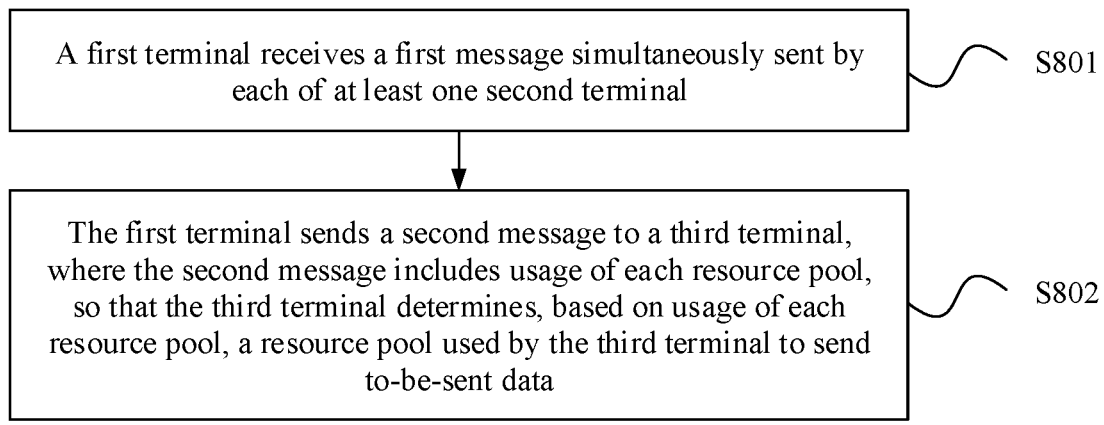
FIG. 8 is a flowchart of another resource processing method according to an embodiment of the present application.

FIG. 8 is a flowchart of another resource processing method according to an embodiment of the present application. The method is performed by a first terminal, where the first terminal may be a vehicle, a computer, a mobile phone, an RSU, or the like. The method includes the following procedure.

Step S801: A first terminal receives a first message simultaneously sent by each of at least one second terminal.

The first message is carried on N resources in at least one resource pool, and N is a positive integer greater than or equal to 2.

Step S802: The first terminal sends a second message to a third terminal, where the second message includes usage of each resource pool, so that each third terminal determines, based on usage of each resource pool, a resource pool used by the third terminal to send to-be-sent data.

Usage of each resource pool includes any one of the following: each resource pool is simultaneously determined by a plurality of terminals, each resource pool is determined by one terminal, or each resource pool is not determined by any terminal.

The third terminal may be any second terminal, or may not be a second terminal. A purpose of sending the second message to the third terminal by the first terminal is to enable the third terminal to avoid, as much as possible, at least one resource pool determined by each second terminal and used to send to-be-sent data. For example, the third terminal may determine a priority of each resource pool based on location information of the at least one resource pool determined by each second terminal and used to send the to-be-sent data, and then select a resource pool with a highest priority, used by the third terminal to send the data; or may determine a priority of each resource pool based on location information of the at least one resource pool determined by each second terminal and used to send the to-be-sent data, and then randomly select, from resource pools whose priorities are higher than a preset value, a resource pool used by the third terminal to send the data.

Figure 9:
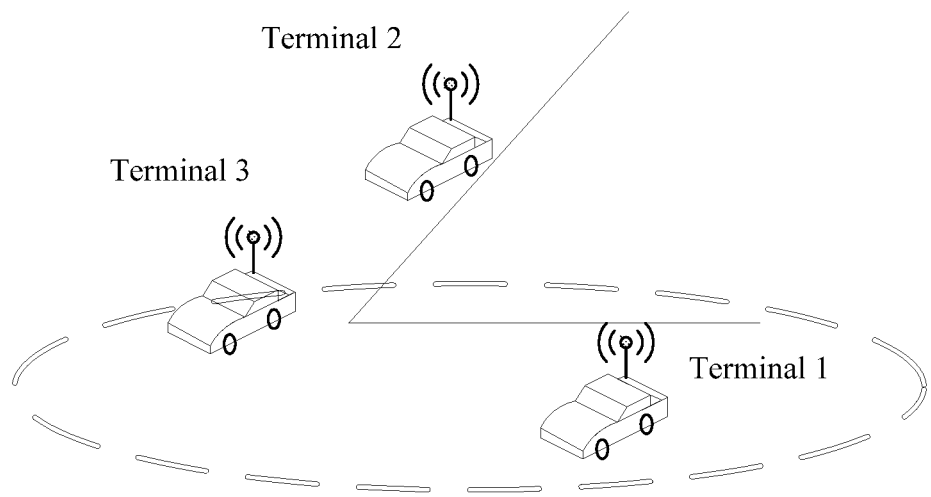
FIG. 9 is a schematic diagram of a scenario including a hidden terminal according to an embodiment of the present application.

It should be noted that, this embodiment of the present application is applicable to a scenario in which a system includes a hidden terminal. FIG. 9 is a schematic diagram of a scenario including a hidden terminal according to an embodiment of the present application. As shown in FIG. 9, a terminal 1 (used as a second terminal) and a terminal 2 (used as a second terminal) simultaneously send first messages respectively on N resources randomly selected from at least one corresponding resource pool. The terminal 1 and the terminal 2 are terminals that are hidden from each other.

To be specific, the terminal 1 and the terminal 2 cannot receive the first messages from each other due to blocking of an obstacle. However, because the first messages are carried on the N resources randomly selected from the at least one resource pool, a probability of collision of the resource pool used by the terminal 1 and the terminal 2 to send the first messages is very low. On this basis, a terminal 3 (used as a first terminal) easily learns the resource pool determined by the terminal 1 and the terminal 2, and therefore, the terminal 3 can accurately determine usage of each resource pool, and send a second message carrying the usage to the terminal 1 (used as a third terminal) or the terminal 2 (used as a third terminal), so that the terminal 1 or the terminal 2 accurately determine, based on the second message, that a hidden terminal exists. On this basis, a resource pool used to send to-be-sent data can be accurately determined. In contrast, in the prior art, resource collision is generated because a terminal 1 and a terminal 2 simultaneously send first messages on a same resource. Consequently, a terminal 3 determines that the resource is not used by any terminal or determines that the resource is used by one terminal, and the terminal 3 does not feed back which terminal specifically uses the resource. In a word, the terminal 3 cannot accurately feed back that the resource is simultaneously used by two terminals. Therefore, the terminal 1 and the terminal 2 cannot determine, based on a second message of the terminal 3, whether a hidden terminal exists, and on this basis, the terminal 1 and the terminal 2 cannot accurately determine a resource pool used to send next to-be-sent data, either.

In this embodiment of the present application, because the first message is carried on the N resources in the at least one resource pool, a probability of collision of the resource pool used by the second terminal to send the first message is very low. On this basis, the first terminal easily learns the resource pool determined by the second terminal, and therefore, can accurately determine usage of each resource pool, and send the second message carrying the usage to the third terminal, so that the third terminal accurately determines the data pool used send the data, thereby improving reliability of a V2X system.

Figure 10:
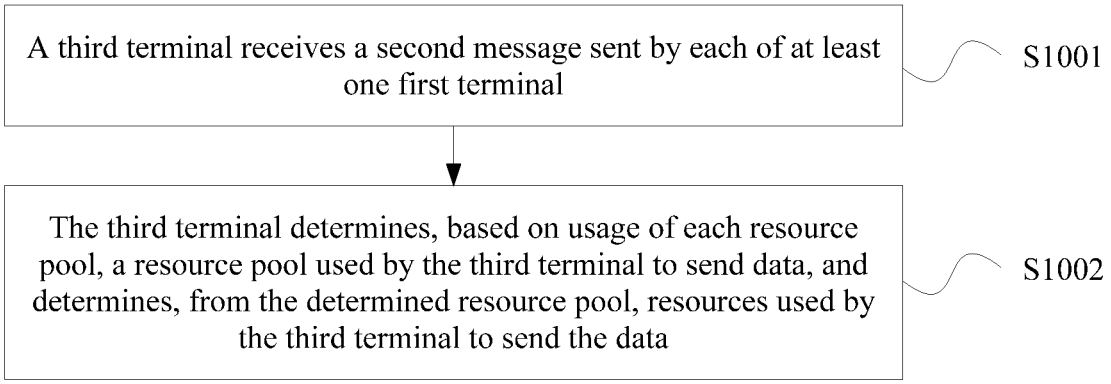
FIG. 10 is a flowchart of still another resource processing method according to an embodiment of the present application.

FIG. 10 is a flowchart of still another resource processing method according to an embodiment of the present application. The method is performed by a third terminal, where the third terminal may be a vehicle, a computer, a mobile phone, an RSU, or the like. The method includes the following procedure.

Step S1001: A third terminal receives a second message sent by each of at least one first terminal.

The second message includes usage of each resource pool, where each resource pool includes a plurality of resources, and usage of each resource pool is determined by the first terminal based on a first message simultaneously sent by each of at least one second terminal. The first message is carried on N resources in at least one resource pool, and is used to indicate location information of a resource pool to which resources belong, and the resources are resources on which to-be-sent data of the second terminal is located, where N is a positive integer greater than or equal to 2.

The first message includes the three forms in the foregoing embodiment of the present application. Details are not described again herein.

Step S1002: The third terminal determines, based on usage of each resource pool, a resource pool used by the third terminal to send data, and determines, from the determined resource pool, resources used by the third terminal to send the data.

A principle of determining, by the third terminal, the resource pool used to send the to-be-sent data is: the third terminal, avoids, as much as possible, the at least one resource pool determined by each second terminal and used to send the to-be-sent data, for example, may determine a priority of each resource pool based on location information of the at least one resource pool determined by each second terminal and used to send the to-be-sent data, and then select a resource pool with a highest priority, used by the third terminal to send the data; or may determine a priority of each resource pool based on location information of the at least one resource pool determined by each second terminal and used to send the data, and then randomly select, from resource pools whose priorities are higher than a preset value, a resource pool used by the third terminal to send the data.

In this embodiment of the present application, because the first message is carried on the N resources in the at least one resource pool, a probability of collision of the resource pool used by the second terminal to send the first message is very low. On this basis, the first terminal easily learns the resource pool determined by the second terminal, and therefore, can accurately determine usage of each resource pool, and send the second message carrying the usage to the third terminal; and the third terminal may accurately determine the data pool used to send the data, thereby improving reliability of a V2X system.

Optionally, that the third terminal determines, based on usage of each resource pool, a resource pool used by the third terminal to send data includes two cases.

First case: When the third terminal has not determined the resource pool used to send the data, the third terminal determines, based on usage of each resource pool, the resource pool used by the third terminal to send the data.

Second case: When the third terminal has determined the resource pool used to send the data, the third terminal redetermines, based on usage of each resource pool and location information of the resource pool determined by the third terminal and used to send the data, a resource pool used by the third terminal to send the data.

Figure 11:
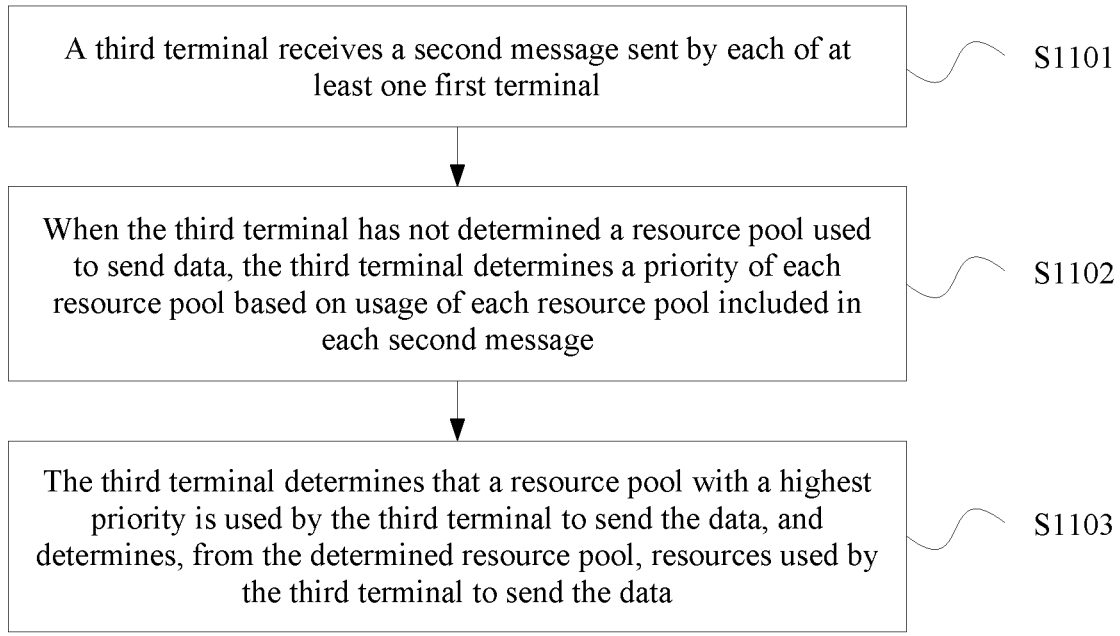
FIG. 11 is a flowchart of a resource processing method according to another embodiment of the present application.

The following describes the first case in detail. FIG. 11 is a flowchart of a resource processing method according to another embodiment of the present application. The method is performed by a third terminal. The method includes the following procedure.

Step S1101: A third terminal receives a second message sent by each of at least one first terminal.

Step S1101 is the same as step S1001, and is not described again herein.

Step S1102: When the third terminal has not determined a resource pool used to send data, the third terminal determines a priority of each resource pool based on usage of each resource pool included in each second message.

Usage of each resource pool includes any one of the following: each resource pool is simultaneously determined by a plurality of terminals, each resource pool is determined by one terminal, or each resource pool is not determined by any terminal.

When usage of each resource pool included in at least one second message is that each resource pool is simultaneously determined by the plurality of terminals, the third terminal determines that the priority of each resource pool is a first priority;

when usage of each resource pool included in no second message is that each resource pool is simultaneously determined by the plurality of terminals, or usage of each resource pool included in at least one second message is that each resource pool is determined by one terminal, the third terminal determines that the priority of each resource pool is a second priority; or when usage of each resource pool included in each second message is that each resource pool is not determined by any terminal, the third terminal determines that the priority of each resource pool is a third priority.

The first priority and the second priority are lower than the third priority, and the first priority may be higher than the second priority, or the first priority may be lower than the second priority. This is not limited in this embodiment of the present application.

A reason why the third terminal sets priorities is as follows: Because a lot of second terminals contend for determining resource pools, the third terminal fails to determine a resource pool, but still reserves the first messages. If the resource pools are avoided during reselection, available resource pools are reduced, resulting in waste of resource pools. However, if the resource pools are directly used, the third terminal may fail to perform determining. Therefore, when usage is that each resource pool is simultaneously determined by the plurality of terminals, the third terminal determines that the priority of each resource pool is the first priority. The third terminal does not use a resource pool that is successfully determined by the second terminal. For example, each resource pool is determined by a terminal, and the priority thereof is set to the second priority. Therefore, performance of the second terminal that successfully determines the resource pool is ensured. When usage of each resource pool is that each resource pool is not determined by any terminal, the third terminal determines that the priority of each resource pool is the third priority.

Step S1103: The third terminal determines that a resource pool with a highest priority is used by the third terminal to send the data, and determines, from the determined resource pool, resources used by the third terminal to send the data.

An example is used for description with reference to step S1101 to step S1103. With reference to application scenarios in FIG. 5A, FIG. 5B, and FIG. 9, a terminal 1 (used as a second terminal) sends a first message on N resources in resource pools 2, 4, 6, and 8, and it is assumed that resource pools determined by the terminal 1 and used to send to-be-sent data are 2, 4, 6, and 8. In addition, a terminal 2 (used as a second terminal) sends a first message on N resources randomly selected from resource pools 1, 4, 6, and 7, and it is assumed that resource pools determined by the terminal 2 and used to send to-be-sent data are 1, 4, 6, and 7. Although the resource pools 4 and 6 are the same for the terminal 1 and the terminal 2, because the terminal 1 sends the first message on the N resources in the resource pools 2, 4, 6, and 8, and the terminal 2 sends the first message on the N resources in the resource pools 1, 4, 6, and 7, a probability of collision of resources is very low. On this basis, a terminal 3 (used as a first terminal) easily receives the first messages sent by the terminal 1 and the terminal 2, to learn location information of at least one resource pool that is respectively determined by the terminal 1 and the terminal 2 and used to send the to-be-sent data. Assuming that the terminal 3 receives only the first messages sent by the terminal 1 and the terminal 2, and that the terminal 3 has not determined a resource pool used to send data, the terminal 3 determines that usage of each resource pool is: the resource pools 1, 2, 7, and 8 are determined by one terminal, and the resource pools 4 and 6 are simultaneously determined by a plurality of terminals (specifically, simultaneously determined by two terminals). The terminal 3 may send a second message carrying the usage to a terminal 4 (the terminal 4 is not shown in FIG. 9, and the terminal 4 is used as a third terminal). Assuming that the terminal 4 has not determined a resource pool, on this basis, the terminal 4 determines that priorities of the resource pools 4 and 6 are the first priority; the terminal 4 determines that the resource pools 1, 2, 7, and 8 are determined by one terminal; the terminal 4 determines that priorities of the resource pools 1, 2, 7, and 8 are the second priority; and the terminal 4 determines that priorities of the resource pools 0, 3, 5, and 9 are the third priority. Finally, the terminal 4 selects some or all of the resource pools 0, 3, 5, and 9 of a highest priority, for sending data.

Optionally, before the third terminal determines, based on usage of each resource pool, a resource pool used by the third terminal to send the data, the method further includes:

the third terminal obtains distance information and/or power information of each first terminal; and the third terminal determines, based on the distance information and/or the power information, at least one first terminal that meets preset conditions, where the distance information is a distance between the third terminal and each first terminal, a preset condition corresponding to the distance information is that the distance between the third terminal and each first terminal is less than a distance threshold, and a preset condition corresponding to the power information is that a power value of each first terminal is greater than a power threshold; and correspondingly, that the third terminal determines, based on usage of each resource pool, a resource pool used by the third terminal to send the data includes: the third terminal determines, based on usage of each resource pool included in a second message sent by the first terminal that meets the preset conditions, the resource pool used by the third terminal to send the data.

In other words, before the third terminal determines, based on usage of each resource pool, the resource pool used by the third terminal to send the data, the third terminal needs to filter the second message sent by the first terminal. Filtering can increase a convergence rate of resource processing and therefore improve system performance of a V2X system.

Further, if the third terminal finds that current resource utilization is lower than a first threshold, the distance threshold may be increased or the power threshold may be reduced, so that sufficient first terminals meet the preset conditions and that resource utilization is improved; correspondingly, when current resource utilization is higher than a second threshold, the distance threshold may be reduced or the power threshold may be increased, so that few first terminals meet the preset conditions and that the convergence rate of resource processing is increased.

Figure 12:
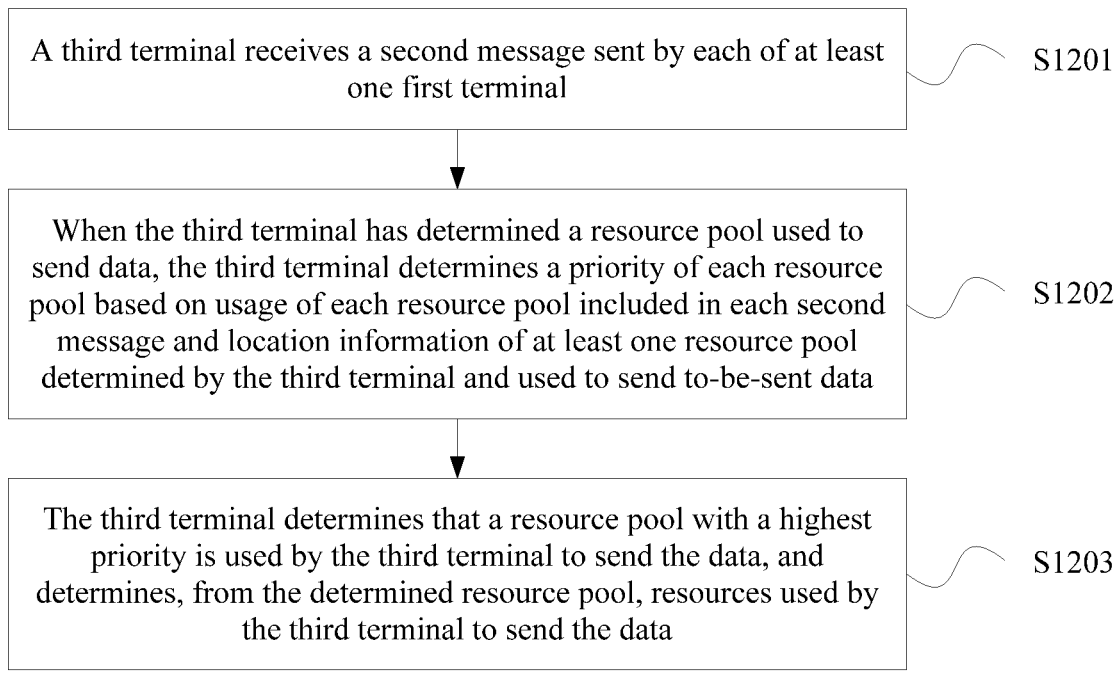
FIG. 12 is a flowchart of a resource processing method according to another embodiment of the present application.

The following describes the second case in detail. FIG. 12 is a flowchart of a resource processing method according to another embodiment of the present application. The method is performed by a third terminal. The method includes the following procedure.

Step S1201: A third terminal receives a second message sent by each of at least one first terminal.

Step S1201 is the same as step S1001, and is not described again herein.

Step S1202: When the third terminal has determined a resource pool used to send data, the third terminal determines a priority of each resource pool based on usage of each resource pool included in each second message and location information of at least one resource pool determined by the third terminal and used to send to-be-sent data.

Usage of each resource pool includes any one of the following: each resource pool is simultaneously determined by a plurality of terminals, each resource pool is determined by one terminal, or each resource pool is not determined by any terminal.

When usage of each resource pool included in no second message is that each resource pool is simultaneously determined by the plurality of terminals, or usage of each resource pool included in at least one second message is that each resource pool is determined by one terminal, the third terminal determines, based on the location information of the at least one resource pool determined by the third terminal and used to send the to-be-sent data, whether the one terminal is the third terminal; and when the third terminal determines that the one terminal is the third terminal, the third terminal determines that the priority of each resource pool is a fifth priority; or when the third terminal determines that the one terminal is not the third terminal, the third terminal determines that the priority of each resource pool is a sixth priority; or when usage of each resource pool included in each second message is that each resource pool is not determined by any terminal, the third terminal determines that the priority of each resource pool is a seventh priority; where the fourth priority and the sixth priority are lower than the fifth priority, and the fourth priority and the sixth priority are lower than the seventh priority.

Step S1203: The third terminal determines that a resource pool with a highest priority is used by the third terminal to send the data, and determines, from the determined resource pool, resources used by the third terminal to send the data.

An example is used for description with reference to step S1201 to step S1203. With reference to application scenarios in FIG. 5A, FIG. 5B, and FIG. 9, a terminal 1 (used as a second terminal) sends a first message on N resources in resource pools 2, 4, 6, and 8, and it is assumed that resource pools determined by the terminal 1 and used to send to-be-sent data are 2, 4, 6, and 8. In addition, a terminal 2 (used as a second terminal) sends a first message on N resources in resource pools 1, 4, 6, and 7, and it is assumed that resource pools determined by the terminal 2 and used to send to-be-sent data are 1, 4, 6, and 7. Although the resource pools 4 and 6 are the same for the terminal 1 and the terminal 2, because the terminal 1 sends the first message on the N resources in the resource pools 2, 4, 6, and 8, and the terminal 2 sends the first message on the N resources in the resource pools 1, 4, 6, and 7, a probability of collision of resources is very low. On this basis, a terminal 3 (used as a first terminal) easily receives the first messages sent by the terminal 1 and the terminal 2, to learn location information of the resource pools that are respectively determined by the terminal 1 and the terminal 2 and used to send the to-be-sent data. Assuming that the terminal 3 receives only the first messages sent by the terminal 1 and the terminal 2, and that the terminal 3 has not determined a resource pool used to send to-be-sent data, the terminal 3 determines that usage of each resource pool is: the resource pools 1, 2, 7, and 8 are determined by one terminal, and the resource pools 4 and 6 are simultaneously determined by a plurality of terminals (specifically, simultaneously determined by two terminals). The terminal 3 may send a second message carrying the usage to the terminal 1 (used as a third terminal) or the terminal 2 (used as a third terminal). On this basis, because the terminal 1 learns that the resource pools 4 and 6 are simultaneously determined by the plurality of terminals, and the terminal 2 learns that the resource pools 4 and 6 are simultaneously determined by the plurality of terminals, both the terminal 1 and the terminal 2 can determine that a hidden terminal exists. Further, the terminal 1 and the terminal 2 may accurately determine usage of each resource pool, and therefore can accurately determine a resource pool used to send the to-be-sent data.

Specifically, assuming that the terminal 1 and the terminal 2 receive only the second message of the terminal 3, a process of determining, by the terminal 1, a resource pool used to send the to-be-sent data includes: when the resource pools 4 and 6 are simultaneously determined by the plurality of terminals, the terminal 1 determines that priorities of the resource pools 4 and 6 are the fourth priority; the terminal 1 determines that the resource pools 1, 2, 7, and 8 are determined by one terminal, where the resource pools 2 and 8 are determined by the terminal 1, and the terminal 1 determines that priorities of the resource pools 2 and 8 are the fifth priority; resource pools 1 and 7 are determined by the terminal 2, and the terminal 1 determines that priorities of the resource pools 1 and 7 are the sixth priority; priorities of remaining resource pools 0, 3, 5, and 9 are the seventh priority; and finally, some or all of the resource pools 0, 3, 5, and 9 of a highest priority are selected for sending the data.

A process of determining, by the terminal 2, a resource pool used to send the to-be-sent data includes: when the resource pools 4 and 6 are simultaneously determined by the plurality of terminals, the terminal 2 determines that priorities of the resource pools 4 and 6 are the fourth priority; the terminal 2 determines that the resource pools 1, 2, 7, and 8 are determined by one terminal, where the resource pools 1 and 7 are determined by the terminal 1, and the terminal 2 determines that priorities of the resource pools 1 and 7 are the fifth priority; the resource pools 2 and 8 are determined by the terminal 2, and the terminal 2 determines that priorities of the resource pools 2 and 8 are the sixth priority; priorities of remaining resource pools 0, 3, 5, and 9 are the seventh priority; and finally, some or all of the resource pools 0, 3, 5, and 9 of a highest priority are selected for sending the data.

Optionally, before the third terminal determines, based on usage of each resource pool, a resource pool used by the third terminal to send the data, the method further includes:

the third terminal obtains distance information and/or power information of each first terminal; and the third terminal determines, based on the distance information and/or the power information, a first terminal that meets preset conditions, where the distance information is a distance between the third terminal and each first terminal, a preset condition corresponding to the distance information is that the distance between the third terminal and each first terminal is less than a distance threshold, and a preset condition corresponding to the power information is that a power value of each first terminal is greater than a power threshold; and correspondingly, that the third terminal determines, based on usage of each resource pool, a resource pool used by the third terminal to send the data includes:

the third terminal determines, based on usage of each resource pool included in a second message sent by the first terminal that meets the preset conditions, the resource pool used by the third terminal to send the data.

In other words, before the third terminal determines, based on usage of each resource pool, the resource pool used by the third terminal to send the data, the third terminal needs to filter the second message sent by the first terminal. Filtering can increase a convergence rate of resource processing and therefore improve system performance of a V2X system.

Further, if the third terminal finds that current resource utilization is lower than a first threshold, the distance threshold may be increased or the power threshold may be reduced, so that sufficient first terminals meet the preset conditions and that resource utilization is improved; correspondingly, when current resource utilization is higher than a second threshold, the distance threshold may be reduced or the power threshold may be increased, so that few first terminals meet the preset conditions and that the convergence rate of resource processing is increased.

Figure 13:
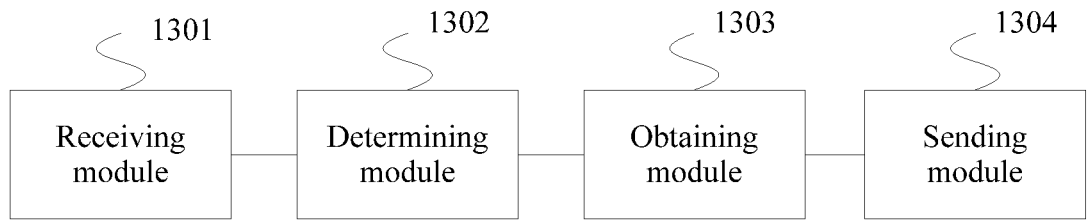
FIG. 13 is a schematic structural diagram of a resource processing apparatus according to an embodiment of the present application.

FIG. 13 is a schematic structural diagram of a resource processing apparatus according to an embodiment of the present application, where the apparatus is the foregoing first terminal. As shown in FIG. 13, the apparatus includes:

a receiving module 1301, configured to receive a first message simultaneously sent by each of at least one second terminal, where the first message is carried on N resources and used to indicate location information of resources on which to-be-sent data is located, and N is a positive integer greater than or equal to 2; and a determining module 1302, configured to determine, based on the location information of the resources on which the to-be-sent data is located, resources used by the apparatus to send data.

The apparatus can perform the foregoing method embodiment corresponding to FIG. 3. Effects are not described again herein.

Optionally, the first message is carried on the N resources in at least one resource pool;

the location information of the resources on which the to-be-sent data is located is location information of a resource pool to which the resources belong, and each resource pool includes a plurality of resources; and correspondingly, the determining module 1302 is specifically configured to:

determine, based on the location information of the resource pool to which the resources belong, a resource pool used by the apparatus to send the data; and determine, from the determined resource pool, the resources used by the apparatus to send the data.

Optionally, the determining module 1302 is specifically configured to:

when the apparatus has not determined the resource pool used to send the data, determine, based on the location information of the resource pool to which the resources belong, the resource pool used by the apparatus to send the data; or when the apparatus has determined the resource pool used to send the data, redetermine, based on the location information of the resource pool to which the resources belong and location information of the resource pool determined by the apparatus and used to send the data, a resource pool used by the apparatus to send the data.

Optionally, the determining module 1302 is specifically configured to:

determine usage of each resource pool based on the location information of the resource pool to which the resources belong;

determine a priority of each resource pool based on usage of each resource pool; and determine that a resource pool with a highest priority is used by the apparatus to send the to-be-sent data; where usage of each resource pool includes any one of the following: each resource pool is simultaneously determined by a plurality of terminals, each resource pool is determined by one terminal, or each resource pool is not determined by any terminal.

Optionally, the determining module 1302 is specifically configured to:

when usage of each resource pool is that each resource pool is simultaneously determined by the plurality of terminals, determine that the priority of each resource pool is a first priority;

when usage of each resource pool is that each resource pool is determined by one terminal, determine that the priority of each resource pool is a second priority; or when usage of each resource pool is that each resource pool is not determined by any terminal, determine that the priority of each resource pool is a third priority; where both the first priority and the second priority are lower than the third priority.

Optionally, the determining module 1302 is specifically configured to:

determine usage of each resource pool based on the location information of the resource pool to which the resources belong and the location information of the resource pool determined by the apparatus and used to send the data;

determine a priority of each resource pool based on usage of each resource pool and the location information of the resource pool determined by the apparatus and used to send the data; and determine that a resource pool with a highest priority is used by the apparatus to send the data; where usage of each resource pool includes any one of the following: each resource pool is simultaneously determined by a plurality of terminals, each resource pool is determined by one terminal, or each resource pool is not determined by any terminal.

Optionally, the determining module 1302 is specifically configured to:

when usage of each resource pool is that each resource pool is simultaneously determined by the plurality of terminals, determine that the priority of each resource pool is a fourth priority; or when usage of each resource pool is that each resource pool is determined by one terminal, determine, based on the location information of the resource pool determined by the apparatus and used to send the data, whether the one terminal is the apparatus; and when determining that the one terminal is the apparatus, determine that the priority of each resource pool is a fifth priority; or when determining that the one terminal is not the apparatus, determine that the priority of each resource pool is a sixth priority; or when usage of each resource pool is that each resource pool is not determined by any terminal, determine that the priority of each resource pool is a seventh priority; where both the fourth priority and the sixth priority are lower than the fifth priority, and both the fourth priority and the sixth priority are lower than the seventh priority.

Optionally, the apparatus further includes an obtaining module 1303, where the obtaining module 1303 is configured to obtain distance information and/or power information of each second terminal;

the determining module 1302 is further configured to determine, based on the distance information and/or the power information, at least one second terminal that meets preset conditions, where the distance information is a distance between the apparatus and each second terminal, a preset condition corresponding to the distance information is that the distance between the apparatus and each second terminal is less than a distance threshold, and a preset condition corresponding to the power information is that a power value of each second terminal is greater than a power threshold; and correspondingly, the determining module 1302 is specifically configured to:

determine, based on location information of a resource pool used by each of the at least one second terminal that meets the preset conditions to send to-be-sent data, the resource pool used by the apparatus to send the data.

Optionally, the apparatus further includes a sending module 1304, configured to send a second message to a third terminal, where the second message includes usage of each resource pool, so that each third terminal determines, based on usage of each resource pool, a resource pool used by the third terminal to send data.

Figure 14:
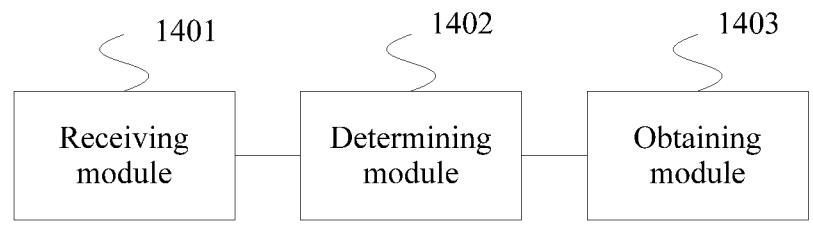
FIG. 14 is a schematic structural diagram of a resource processing apparatus according to another embodiment of the present application.

FIG. 14 is a schematic structural diagram of a resource processing apparatus according to another embodiment of the present application, where the apparatus is the foregoing third terminal. As shown in FIG. 14, the apparatus includes:

a receiving module 1401, configured to receive a second message sent by each of at least one first terminal, where the second message includes usage of each resource pool, each resource pool includes a plurality of resources, usage of each resource pool is determined by the first terminal based on a first message simultaneously sent by each of at least one second terminal, the first message is carried on N resources in at least one resource pool, and N is a positive integer greater than or equal to 2; and a determining module 1402, configured to determine, based on usage of each resource pool, a resource pool used by the apparatus to send data, and determine, from the determined resource pool, resources used by the apparatus to send the data.

The apparatus can perform the foregoing method embodiment corresponding to FIG. 10. Effects are not described again herein.

Optionally, the determining module 1402 is specifically configured to:

when the apparatus has not determined the resource pool used to send the data, determine, based on usage of each resource pool, the resource pool used by the apparatus to send the data; or when the apparatus has determined the resource pool used to send the data, redetermine, based on usage of each resource pool and location information of the resource pool determined by the apparatus and used to send the data, a resource pool used by the apparatus to send the data.

Optionally, the determining module 1402 is specifically configured to:

determine a priority of each resource pool based on usage of each resource pool included in each second message; and determine that a resource pool with a highest priority is used by the apparatus to send the data; where usage of each resource pool includes any one of the following: each resource pool is simultaneously determined by a plurality of terminals, each resource pool is determined by one terminal, or each resource pool is not determined by any terminal.

Optionally, the determining module 1402 is specifically configured to:

when usage of each resource pool included in at least one second message is that each resource pool is simultaneously determined by the plurality of terminals, determine that the priority of each resource pool is a first priority;

when usage of each resource pool included in no second message is that each resource pool is simultaneously determined by the plurality of terminals, or usage of each resource pool included in at least one second message is that each resource pool is determined by one terminal, determine that the priority of each resource pool is a second priority; or when usage of each resource pool included in each second message is that each resource pool is not determined by any terminal, determine that the priority of each resource pool is a third priority; where both the first priority and the second priority are lower than the third priority.

Optionally, the determining module 1402 is specifically configured to:

determine a priority of each resource pool based on usage of each resource pool included in each second message and location information of at least one resource pool determined by the apparatus and used to send the to-be-sent data; and determine that a resource pool with a highest priority is used by the apparatus to send the to-be-sent data; where usage of each resource pool includes any one of the following: each resource pool is simultaneously determined by a plurality of terminals, each resource pool is determined by one terminal, or each resource pool is not determined by any terminal.

Optionally, the determining module 1402 is specifically configured to:

when usage of each resource pool included in at least one second message is that each resource pool is simultaneously determined by the plurality of terminals, determine that the priority of each resource pool is a fourth priority; or when usage of each resource pool included in no second message is that each resource pool is simultaneously determined by the plurality of terminals, or usage of each resource pool included in at least one second message is that each resource pool is determined by one terminal, determine, based on the location information of the at least one resource pool determined by the apparatus and used to send the to-be-sent data, whether the one terminal is the apparatus; and when determining that the one terminal is the apparatus, determine that the priority of each resource pool is a fifth priority; or when determining that the one terminal is not the apparatus, determine that the priority of each resource pool is a sixth priority; or when usage of each resource pool included in each second message is that each resource pool is not determined by any terminal, determine, by the apparatus, that the priority of each resource pool is a seventh priority; where the fourth priority and the sixth priority are lower than the fifth priority, and the fourth priority and the sixth priority are lower than the seventh priority.

Optionally, the apparatus further includes an obtaining module 1403, where the obtaining module 1403 is configured to obtain distance information and/or power information of each first terminal;

the determining module 1402 is further configured to determine, based on the distance information and/or the power information, a first terminal that meets preset conditions, where the distance information is a distance between the apparatus and each first terminal, a preset condition corresponding to the distance information is that the distance between the apparatus and each first terminal is less than a distance threshold, and a preset condition corresponding to the power information is that a power value of each first terminal is greater than a power threshold; and correspondingly, the determining module 1402 is specifically configured to:

determine, based on usage of each resource pool included in a second message sent by the first terminal that meets the preset conditions, the resource pool used by the apparatus to send the data.

Optionally, the first message includes first indication information and second indication information, the first indication information is used to indicate location information of a resource pool used by each second terminal to send current data, and the second indication information is used to indicate an offset of the location information of the resource pool used to send the current data, to a resource pool in which to-be-sent data of each second terminal is located.

Figure 15:
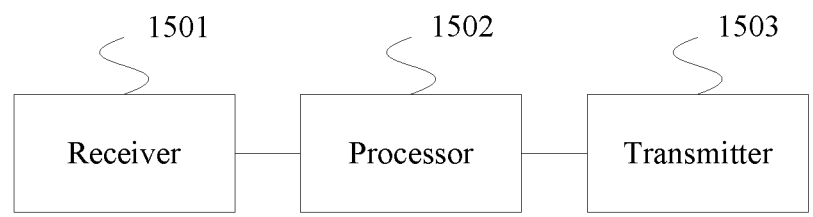
FIG. 15 is a schematic structural diagram of a terminal according to an embodiment of the present application.

FIG. 15 is a schematic structural diagram of a terminal according to an embodiment of the present application, where the terminal is the foregoing first terminal. As shown in FIG. 15, the terminal includes:

a receiver 1501, configured to receive a first message simultaneously sent by each of at least one second terminal, where the first message is carried on N resources and used to indicate location information of resources on which to-be-sent data is located, and N is a positive integer greater than or equal to 2; and a processor 1502, configured to determine, based on the location information of the resources on which the to-be-sent data is located, resources used by the terminal to send data.

The terminal can perform the foregoing method embodiment corresponding to FIG. 3. Effects are not described again herein.

Optionally, the first message is carried on the N resources in at least one resource pool;

the location information of the resources on which the to-be-sent data is located is location information of a resource pool to which the resources belong, and each resource pool includes a plurality of resources; and correspondingly, the processor 1502 is specifically configured to:

determine, based on the location information of the resource pool to which the resources belong, a resource pool used by the terminal to send the data; and determine, from the determined resource pool, the resources used by the terminal to send the data.

Optionally, the processor 1502 is specifically configured to:

when the terminal has not determined the resource pool used to send the data, determine, based on the location information of the resource pool to which the resources belong, the resource pool used by the terminal to send the data; or when the terminal has determined the resource pool used to send the data, redetermine, based on the location information of the resource pool to which the resources belong and location information of the resource pool determined by the terminal and used to send the data, a resource pool used by the terminal to send the data.

Optionally, the processor 1502 is specifically configured to:

determine usage of each resource pool based on the location information of the resource pool to which the resources belong;

determine a priority of each resource pool based on usage of each resource pool; and determine that a resource pool with a highest priority is used by the terminal to send the to-be-sent data; where usage of each resource pool includes any one of the following: each resource pool is simultaneously determined by a plurality of terminals, each resource pool is determined by one terminal, or each resource pool is not determined by any terminal.

Optionally, the processor 1502 is specifically configured to:

when usage of each resource pool is that each resource pool is simultaneously determined by the plurality of terminals, determine that the priority of each resource pool is a first priority;

when usage of each resource pool is that each resource pool is determined by one terminal, determine that the priority of each resource pool is a second priority; or when usage of each resource pool is that each resource pool is not determined by any terminal, determine that the priority of each resource pool is a third priority; where both the first priority and the second priority are lower than the third priority.

Optionally, the processor 1502 is specifically configured to:

determine usage of each resource pool based on the location information of the resource pool to which the resources belong and the location information of the resource pool determined by the terminal and used to send the data;

determine a priority of each resource pool based on usage of each resource pool and the location information of the resource pool determined by the terminal and used to send the data; and determine that a resource pool with a highest priority is used by the terminal to send the data; where usage of each resource pool includes any one of the following: each resource pool is simultaneously determined by a plurality of terminals, each resource pool is determined by one terminal, or each resource pool is not determined by any terminal.

Optionally, the processor 1502 is specifically configured to:

when usage of each resource pool is that each resource pool is simultaneously determined by the plurality of terminals, determine that the priority of each resource pool is a fourth priority; or when usage of each resource pool is that each resource pool is determined by one terminal, determine, based on the location information of the resource pool determined by the terminal and used to send the data, whether the one terminal is the terminal; and when determining that the one terminal is the terminal, determine that the priority of each resource pool is a fifth priority; or when determining that the one terminal is not the terminal, determine that the priority of each resource pool is a sixth priority; or when usage of each resource pool is that each resource pool is not determined by any terminal, determine that the priority of each resource pool is a seventh priority; where both the fourth priority and the sixth priority are lower than the fifth priority, and both the fourth priority and the sixth priority are lower than the seventh priority.

Optionally, the processor 1502 is further configured to:

obtain distance information and/or power information of each second terminal; and determine, based on the distance information and/or the power information, at least one second terminal that meets preset conditions, where the distance information is a distance between the terminal and each second terminal, a preset condition corresponding to the distance information is that the distance between the terminal and each second terminal is less than a distance threshold, and a preset condition corresponding to the power information is that a power value of each second terminal is greater than a power threshold; and correspondingly, the processor 1502 is specifically configured to:

determine, based on location information of a resource pool used by each of the at least one second terminal that meets the preset conditions to send to-be-sent data, the resource pool used by the terminal to send the data.

Optionally, the terminal further includes a transmitter 1503, configured to send a second message to a third terminal, where the second message includes usage of each resource pool, so that each third terminal determines, based on usage of each resource pool, a resource pool used by the third terminal to send data.

Figure 16:
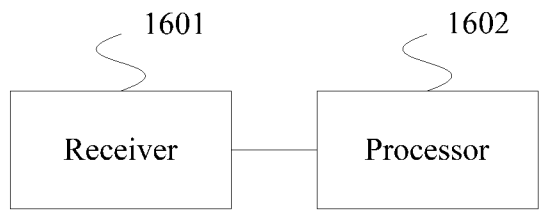
FIG. 16 is a schematic structural diagram of a terminal according to another embodiment of the present application.

FIG. 16 is a schematic structural diagram of a terminal according to another embodiment of the present application, where the terminal is the foregoing third terminal. As shown in FIG. 16, the terminal includes:

a receiver 1601, configured to receive a second message sent by each of at least one first terminal, where the second message includes usage of each resource pool, each resource pool includes a plurality of resources, usage of each resource pool is determined by the first terminal based on a first message simultaneously sent by each of at least one second terminal, the first message is carried on N resources in at least one resource pool, and N is a positive integer greater than or equal to 2; and a processor 1602, configured to determine, based on usage of each resource pool, a resource pool used by the terminal to send data, and determine, from the determined resource pool, resources used by the terminal to send the data.

The terminal can perform the foregoing method embodiment corresponding to FIG. 10. Effects are not described again herein.

Optionally, the processor 1602 is specifically configured to:

when the terminal has not determined the resource pool used to send the data, determine, based on usage of each resource pool, the resource pool used by the terminal to send the data; or when the terminal has determined the resource pool used to send the data, redetermine, based on usage of each resource pool and location information of the resource pool determined by the terminal and used to send the data, a resource pool used by the terminal to send the data.

Optionally, the processor 1602 is specifically configured to:

determine a priority of each resource pool based on usage of each resource pool included in each second message; and determine that a resource pool with a highest priority is used by the terminal to send the data; where usage of each resource pool includes any one of the following: each resource pool is simultaneously determined by a plurality of terminals, each resource pool is determined by one terminal, or each resource pool is not determined by any terminal.

Optionally, the processor 1602 is specifically configured to:

when usage of each resource pool included in at least one second message is that each resource pool is simultaneously determined by the plurality of terminals, determine that the priority of each resource pool is a first priority;

when usage of each resource pool included in no second message is that each resource pool is simultaneously determined by the plurality of terminals, or usage of each resource pool included in at least one second message is that each resource pool is determined by one terminal, determine that the priority of each resource pool is a second priority; or when usage of each resource pool included in each second message is that each resource pool is not determined by any terminal, determine that the priority of each resource pool is a third priority; where both the first priority and the second priority are lower than the third priority.

Optionally, the processor 1602 is specifically configured to:

determine a priority of each resource pool based on usage of each resource pool included in each second message and location information of at least one resource pool determined by the terminal and used to send the to-be-sent data; and determine that a resource pool with a highest priority is used by the terminal to send the to-be-sent data; where usage of each resource pool includes any one of the following: each resource pool is simultaneously determined by a plurality of terminals, each resource pool is determined by one terminal, or each resource pool is not determined by any terminal.

Optionally, the processor 1602 is specifically configured to:

when usage of each resource pool included in at least one second message is that each resource pool is simultaneously determined by the plurality of terminals, determine that the priority of each resource pool is a fourth priority; or when usage of each resource pool included in no second message is that each resource pool is simultaneously determined by the plurality of terminals, or usage of each resource pool included in at least one second message is that each resource pool is determined by one terminal, determine, based on the location information of the at least one resource pool determined by the terminal and used to send the to-be-sent data, whether the one terminal is the terminal; and when determining that the one terminal is the terminal, determine that the priority of each resource pool is a fifth priority; or when determining that the one terminal is not the terminal, determine that the priority of each resource pool is a sixth priority; or when usage of each resource pool included in each second message is that each resource pool is not determined by any terminal, determine, by the terminal, that the priority of each resource pool is a seventh priority; where the fourth priority and the sixth priority are lower than the fifth priority, and the fourth priority and the sixth priority are lower than the seventh priority.

Optionally, the processor 1602 is further configured to:

obtain distance information and/or power information of each first terminal; and determine, based on the distance information and/or the power information, a first terminal that meets preset conditions, where the distance information is a distance between the terminal and each first terminal, a preset condition corresponding to the distance information is that the distance between the terminal and each first terminal is less than a distance threshold, and a preset condition corresponding to the power information is that a power value of each first terminal is greater than a power threshold; and correspondingly, the processor 1602 is specifically configured to:

determine, based on usage of each resource pool included in a second message sent by the first terminal that meets the preset conditions, the resource pool used by the terminal to send the data.

Optionally, the first message includes first indication information and second indication information, the first indication information is used to indicate location information of a resource pool used by each second terminal to send current data, and the second indication information is used to indicate an offset of the location information of the resource pool used to send the current data, to a resource pool in which to-be-sent data of each second terminal is located.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method of processing resources, comprising:
   receiving, by a first terminal, a first message from each of at least one second terminal, wherein the first message is carried on N resources and used to indicate location information of resources on which to-be-sent data is located, and N is a positive integer greater than or equal to 2; and
   determining, by the first terminal based on the location information of the resources on which the to-be-sent data is located, resources used by the first terminal to send data; and, wherein
   the first message is carried on the N resources in at least one resource pool;
   the location information of the resources on which the to-be-sent data is located is location information of a resource pool to which the resources belong, and each resource pool comprises a plurality of resources; and
   determining, by the first terminal based on the location information of the resources on which the to-be-sent data is located, the resources used by the first terminal to send data comprises:
   determining, by the first terminal based on the location information of the resource pool to which the resources belong, a resource pool used by the first terminal to send the data; and
   determining, by the first terminal from the determined resource pool, the resources used by the first terminal to send the data.

2. The method according to claim 1, wherein determining, by the first terminal based on the location information of the resource pool to which the resources belong, the resource pool used by the first terminal to send the data comprises:

when the first terminal has not determined the resource pool used to send the data, determining, by the first terminal based on the location information of the resource pool to which the resources belong, the resource pool used by the first terminal to send the data; and when the first terminal has determined the resource pool used to send the data, re-determining, by the first terminal based on the location information of the resource pool to which the resources belong and location information of the resource pool that has been determined by the first terminal and is used to send the data, a resource pool used by the first terminal to send the data.

3. The method according to claim 2, wherein when the first terminal has not determined the resource pool used to send the data, determining, by the first terminal based on the location information of the resource pool to which the resources belong, the resource pool used by the first terminal to send the data comprises:
   determining, by the first terminal, usage of each resource pool based on the location information of the resource pool to which the resources belong;
   determining, by the first terminal, a priority of each resource pool based on usage of each resource pool; and
   determining, by the first terminal, that a resource pool with a highest priority is used by the first terminal to send the data, wherein
   usage of each resource pool comprises any one of the following: each resource pool is determined by a plurality of terminals, each resource pool is determined by one terminal, or each resource pool is not determined by any terminal.

4. The method according to claim 2, wherein when the first terminal has determined a resource pool used to send the data, re-determining, by the first terminal based on the location information of the resource pool to which the resources belong and location information of the resource pool that has been determined by the first terminal and is used to send the data, the resource pool used by the first terminal to send the data comprises:
   determining, by the first terminal, a usage of each resource pool based on the location information of the resource pool to which the resources belong and the location information of the resource pool that has been determined by the first terminal and is used to send the data;
   determining, by the first terminal, a priority of each resource pool based on usage of each resource pool and the location information of the resource pool that has been determined by the first terminal and is used to send the data; and
   determining, by the first terminal, that a resource pool with a highest priority is used by the first terminal to send the data; and, wherein
   the usage of each resource pool comprises any one of the following: each resource pool is determined by a plurality of terminals, each resource pool is determined by one terminal, or each resource pool is not determined by any terminal.

5. The method according to claim 1, wherein before determining, by the first terminal based on the location information of the resource pool to which the resources belong, the resource pool used by the first terminal to send the data, the method further comprises:

obtaining, by the first terminal, distance information and/or power information of each second terminal; and determining, by the first terminal based on the distance information and/or the power information, at least one second terminal that meets preset conditions, wherein the distance information is a distance between the first terminal and each second terminal, a preset condition corresponding to the distance information is that the distance between the first terminal and each second terminal is less than a distance threshold, and a preset condition corresponding to the power information is that a power value of each second terminal is greater than a power threshold; and, wherein determining, by the first terminal based on the location information of the resource pool to which the resources belong, the resource pool used by the first terminal to send the data comprises:

determining, by the first terminal based on location information of a resource pool used by each of the at least one second terminal that meets the preset conditions to send to-be-sent data, the resource pool used by the first terminal to send the data.

6. A method of processing resources, comprising:

receiving, by a third terminal, a second message from each of at least one first terminal, wherein the second message comprises usage of each resource pool, each resource pool comprises a plurality of resources, usage of each resource pool is determined by the first terminal based on a first message from each of at least one second terminal, the first message is carried on N resources in at least one resource pool, and N is a positive integer greater than or equal to 2; and determining, by the third terminal based on usage of each resource pool, a resource pool used by the third terminal to send data, and determining, from the determined resource pool, resources used by the third terminal to send the data and, wherein before determining, by the third terminal based on usage of each resource pool, the resource pool used by the third terminal to send data, the method further comprises:

obtaining, by the third terminal, distance information and/or power information of each first terminal; and determining, by the third terminal based on the distance information and/or the power information, a first terminal that meets preset conditions, wherein the distance information is a distance between the third terminal and each first terminal, a preset condition corresponding to the distance information is that the distance between the third terminal and each first terminal is less than a distance threshold, and a preset condition corresponding to the power information is that a power value of each first terminal is greater than a power threshold; and, wherein determining, by the third terminal based on usage of each resource pool, the resource pool used by the third terminal to send data comprises:

determining, by the third terminal based on usage of each resource pool comprised in a second message from the first terminal that meets the preset conditions, the resource pool used by the third terminal to send the data.

7. The method according to claim 6, wherein determining, by the third terminal based on the usage of each resource pool, the resource pool used by the third terminal to send the data comprises:

when the third terminal has not determined the resource pool used to send the data, determining, by the third terminal based on usage of each resource pool, the resource pool used by the third terminal to send the data; and when the third terminal has determined the resource pool used to send the data, re-determining, by the third terminal based on usage of each resource pool and location information of the resource pool determined by the third terminal and used to send the data, a resource pool used by the third terminal to send the data.

8. The method according to claim 7, wherein when the third terminal has not determined a resource pool used to send the data, determining, by the third terminal based on usage of each resource pool, the resource pool used by the third terminal to send the data comprises:

determining, by the third terminal, a priority of each resource pool based on usage of each resource pool comprised in each second message; and determining, by the third terminal, that a resource pool with a highest priority is used by the third terminal to send the data; and, wherein a usage of each resource pool comprises any one of the following: each resource pool is determined by a plurality of terminals, each resource pool is determined by one terminal, or each resource pool is not determined by any terminal.

9. The method according to claim 7, wherein when the third terminal has determined the resource pool used to send the data, re-determining, by the third terminal based on usage of each resource pool and location information of the resource pool determined by the third terminal and used to send the data, the resource pool used by the third terminal to send the data comprises:

determining, by the third terminal, a priority of each resource pool based on usage of each resource pool comprised in each second message and location information of at least one resource pool determined by the third terminal and used to send the to-be-sent data; and determining, by the third terminal, that a resource pool with a highest priority is used by the third terminal to send the to-be-sent data; and, wherein a usage of each resource pool comprises any one of the following: each resource pool is determined by a plurality of terminals, each resource pool is determined by one terminal, or each resource pool is not determined by any terminal.

10. The method according to claim 6, wherein the first message comprises first indication information and second indication information, wherein the first indication information is used to indicate location information of a resource pool used by each second terminal to send current data, and the second indication information is used to indicate an offset of the location information of the resource pool used to send the current data, to a resource pool in which to-be-sent data of each second terminal is located.

11. A terminal, comprising:

a receiver to receive a first message from each of at least one second terminal, wherein the first message is carried on N resources and used to indicate location information of resources on which to-be-sent data is located, and N is a positive integer greater than or equal to 2; and a processor to determine, based on the location information of the resources on which the to-be-sent data is located, resources used by the terminal to send data;

and, wherein the first message is carried on the N resources in at least one resource pool;

the location information of the resources on which the to-be-sent data is located is location information of a resource pool to which the resources belong, and each resource pool comprises a plurality of resources; and the processor is to:

determine, based on the location information of the resource pool to which the resources belong, a resource pool used by the terminal to send the data; and determine, from the determined resource pool, the resources used by the terminal to send the data.

12. The terminal according to claim 11, wherein the processor is to:

when the terminal has not determined the resource pool used to send the data, determine, based on the location information of the resource pool to which the resources belong, the resource pool used by the terminal to send the data; and when the terminal has determined the resource pool used to send the data, re-determine, based on the location information of the resource pool to which the resources belong and location information of the resource pool determined by the terminal and used to send the data, a resource pool used by the terminal to send the data.

13. The terminal according to claim 12, wherein the processor is to:

determine a usage of each resource pool based on the location information of the resource pool to which the resources belong;

determine a priority of each resource pool based on usage of each resource pool; and determine that a resource pool with a highest priority is used by the terminal to send the to-be-sent data; and, wherein a usage of each resource pool comprises any one of the following: each resource pool is determined by a plurality of terminals, each resource pool is determined by one terminal, or each resource pool is not determined by any terminal.

14. The terminal according to claim 12, wherein the processor is to:

determine a usage of each resource pool based on the location information of the resource pool to which the resources belong and the location information of the resource pool determined by the terminal and used to send the data;

determine a priority of each resource pool based on usage of each resource pool and the location information of the resource pool determined by the terminal and used to send the data; and determine that a resource pool with a highest priority is used by the terminal to send the data; and, wherein a usage of each resource pool comprises any one of the following: each resource pool is determined by a plurality of terminals, each resource pool is determined by one terminal, or each resource pool is not determined by any terminal.

15. The terminal according to claim 11, wherein the processor is further to:

obtain distance information and/or power information of each second terminal; and determine, based on the distance information and/or the power information, at least one second terminal that meets preset conditions, wherein the distance information is a distance between the terminal and each second terminal, a preset condition corresponding to the distance information is that the distance between the terminal and each second terminal is less than a distance threshold, and a preset condition corresponding to the power information is that a power value of each second terminal is greater than a power threshold; and, wherein the processor is to:

determine, based on location information of a resource pool used by each of the at least one second terminal that meets the preset conditions to send to-be-sent data, the resource pool used by the terminal to send the data.

16. A terminal, comprising:

a receiver to receive a second message from each of at least one first terminal, wherein the second message comprises usage of each resource pool, wherein each resource pool comprises a plurality of resources, a usage of each resource pool is determined by the first terminal based on a first message from each of at least one second terminal, the first message is carried on N resources in at least one resource pool, and N is a positive integer greater than or equal to 2; and a processor configured to determine, based on usage of each resource pool, a resource pool used by the terminal to send data, and determine, from the determined resource pool, resources used by the terminal to send the data; and, wherein the processor is further caused to:

obtain distance information and/or power information of each first terminal;

determine, based on the distance information and/or the power information, a first terminal that meets preset conditions, wherein the distance information is a distance between the terminal and each first terminal, a preset condition corresponding to the distance information is that the distance between the terminal and each first terminal is less than a distance threshold, and a preset condition corresponding to the power information is that a power value of each first terminal is greater than a power threshold; and determine, based on usage of each resource pool comprised in a second message from the first terminal that meets the preset conditions, the resource pool used by the terminal to send the data.

17. The terminal according to claim 16, wherein the processor is further configured to:

when the terminal has not determined the resource pool used to send the data, determine, based on usage of each resource pool, the resource pool used by the terminal to send the data; and when the terminal has determined the resource pool used to send the data, re-determine, based on usage of each resource pool and location information of the resource pool determined by the terminal and used to send the data, a resource pool used by the terminal to send the data.

18. The terminal according to claim 17, wherein the processor is further configured to:

determine a priority of each resource pool based on usage of each resource pool comprised in each second message; and determine that a resource pool with a highest priority is used by the terminal to send the data; and wherein a usage of each resource pool comprises any one of the following: each resource pool is determined by a plurality of terminals, each resource pool is determined by one terminal, or each resource pool is not determined by any terminal.

19. The terminal according to claim 17, wherein the processor is further configured to:
- determine a priority of each resource pool based on usage of each resource pool comprised in each second message and location information of at least one resource pool determined by the terminal and used to send the to-be-sent data; and
- determine that a resource pool with a highest priority is used by the terminal to send the to-be-sent data; and wherein
- a usage of each resource pool comprises any one of the following: each resource pool is determined by a plurality of terminals, each resource pool is determined by one terminal, or each resource pool is not determined by any terminal.

* * * * *